United States Patent
Kim et al.

(10) Patent No.: US 11,993,233 B2
(45) Date of Patent: May 28, 2024

(54) ELECTRIC BRAKE SYSTEM AND OPERATION METHOD

(71) Applicant: HL MANDO CORPORATION, Gyeonggi-do (KR)

(72) Inventors: Jin Seok Kim, Gyeonggi-do (KR); Seong Ho Choi, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 358 days.

(21) Appl. No.: 17/614,371

(22) PCT Filed: Apr. 29, 2020

(86) PCT No.: PCT/KR2020/005811
§ 371 (c)(1),
(2) Date: Nov. 26, 2021

(87) PCT Pub. No.: WO2020/242071
PCT Pub. Date: Dec. 3, 2020

(65) Prior Publication Data
US 2022/0227344 A1  Jul. 21, 2022

(30) Foreign Application Priority Data

May 31, 2019 (KR) .................. 10-2019-0064832

(51) Int. Cl.
*B60T 13/68* (2006.01)
*B60T 8/40* (2006.01)
(Continued)

(52) U.S. Cl.
CPC .......... *B60T 13/686* (2013.01); *B60T 8/4081* (2013.01); *B60T 13/142* (2013.01); *B60T 13/586* (2013.01);
(Continued)

(58) Field of Classification Search
CPC .... B60T 13/686; B60T 13/142; B60T 13/586; B60T 13/62; B60T 8/4081;
(Continued)

(56) References Cited

U.S. PATENT DOCUMENTS 5,496,099 A  3/1996 Resch
5,729,979 A  3/1998 Shaw et al.
(Continued)

FOREIGN PATENT DOCUMENTS

CN  103029696  4/2013
CN  104284819  1/2015
(Continued)

OTHER PUBLICATIONS

Office Action dated Sep. 1, 2023 for Chinese Patent Application No. 202080038880.5 and its English machine translation by Google Translate.
(Continued)

*Primary Examiner* — Vishal R Sahni
(74) *Attorney, Agent, or Firm* — Ladas & Parry, LLP

(57) ABSTRACT

Provided is an electronic brake system. The electronic brake system includes: a reservoir in which a pressurized medium is stored; an integrated master cylinder including a master chamber and a simulation chamber; a reservoir flow path to communicate the integrated master cylinder and the reservoir; a hydraulic pressure supply device configured to generate a hydraulic pressure by operating a hydraulic piston according to an electrical signal output in response to a displacement of a brake pedal, and including a first pressure chamber provided on one side of the hydraulic piston accommodated to be movable in a cylinder block and connected to one or more wheel cylinders, and a second pressure chamber provided on another side of the hydraulic piston and connected to the one or more wheel cylinders; a
(Continued)

hydraulic control unit having a first hydraulic circuit configured to control a hydraulic pressure transferred to two wheel cylinders and a second hydraulic circuit configured to control a hydraulic pressure transferred to other two wheel cylinders; and an electronic control unit configured to control valves based on hydraulic pressure information and displacement information of the brake pedal.

19 Claims, 15 Drawing Sheets

(51) Int. Cl.
  *B60T 13/14* (2006.01)
  *B60T 13/58* (2006.01)
  *B60T 13/62* (2006.01)
(52) U.S. Cl.
  CPC ......... *B60T 13/62* (2013.01); *B60T 2270/402* (2013.01); *B60T 2270/404* (2013.01); *B60T 2270/604* (2013.01); *B60T 2270/82* (2013.01)
(58) Field of Classification Search
  CPC ........... B60T 2270/604; B60T 2270/82; B60T 2270/402; B60T 2270/404
  See application file for complete search history.

(56) References Cited

U.S. PATENT DOCUMENTS

| | | | |
|---|---|---|---|
| 6,209,970 B1 | 4/2001 | Kamiya et al. | |
| 2017/0210369 A1* | 7/2017 | Lim | B60T 13/04 |
| 2017/0334417 A1* | 11/2017 | Choi | B60T 13/686 |
| 2022/0017052 A1* | 1/2022 | Kim | B60T 7/042 |
| 2022/0242381 A1* | 8/2022 | Kim | F16K 31/62 |
| 2023/0071822 A1* | 3/2023 | Park | B60T 13/686 |

FOREIGN PATENT DOCUMENTS

| | | | | |
|---|---|---|---|---|
| CN | 107757589 | | 3/2018 | |
| CN | 109572652 | | 4/2019 | |
| DE | 11 2013 001 645 | | 12/2014 | |
| DE | 102016222825 | A1 * | 5/2017 | ............. B60T 13/12 |
| JP | 2000-95089 | | 4/2000 | |
| JP | 2003-252199 | | 9/2003 | |
| KR | 10-2009- 0077182 | | 7/2009 | |
| KR | 10-2014- 0135043 | | 11/2014 | |
| KR | 10-2015-0138295 | | 12/2015 | |
| KR | 10-2016- 0028043 | | 3/2016 | |
| KR | 10-2019- 0035256 | | 4/2019 | |
| KR | 10-2019- 0037765 | | 4/2019 | |
| KR | 10-2020- 0060039 | | 5/2020 | |

OTHER PUBLICATIONS

Office Action dated Sep. 26, 2023 for Korean Patent Application No. 10-2019- 0064827and its English translation from Global Dossier.

International Search Report for PCT/KR2020/005811 dated Aug. 26, 2020 (now published as WO 2020/242071) with English translation provided by WIPO.

Written Opinion of the International Searching Authority for PCT/KR2020/005811 dated Aug. 26, 2020 (now published as WO 2020/242071) with English translation provided by Google Translate.

* cited by examiner

[Fig. 1]
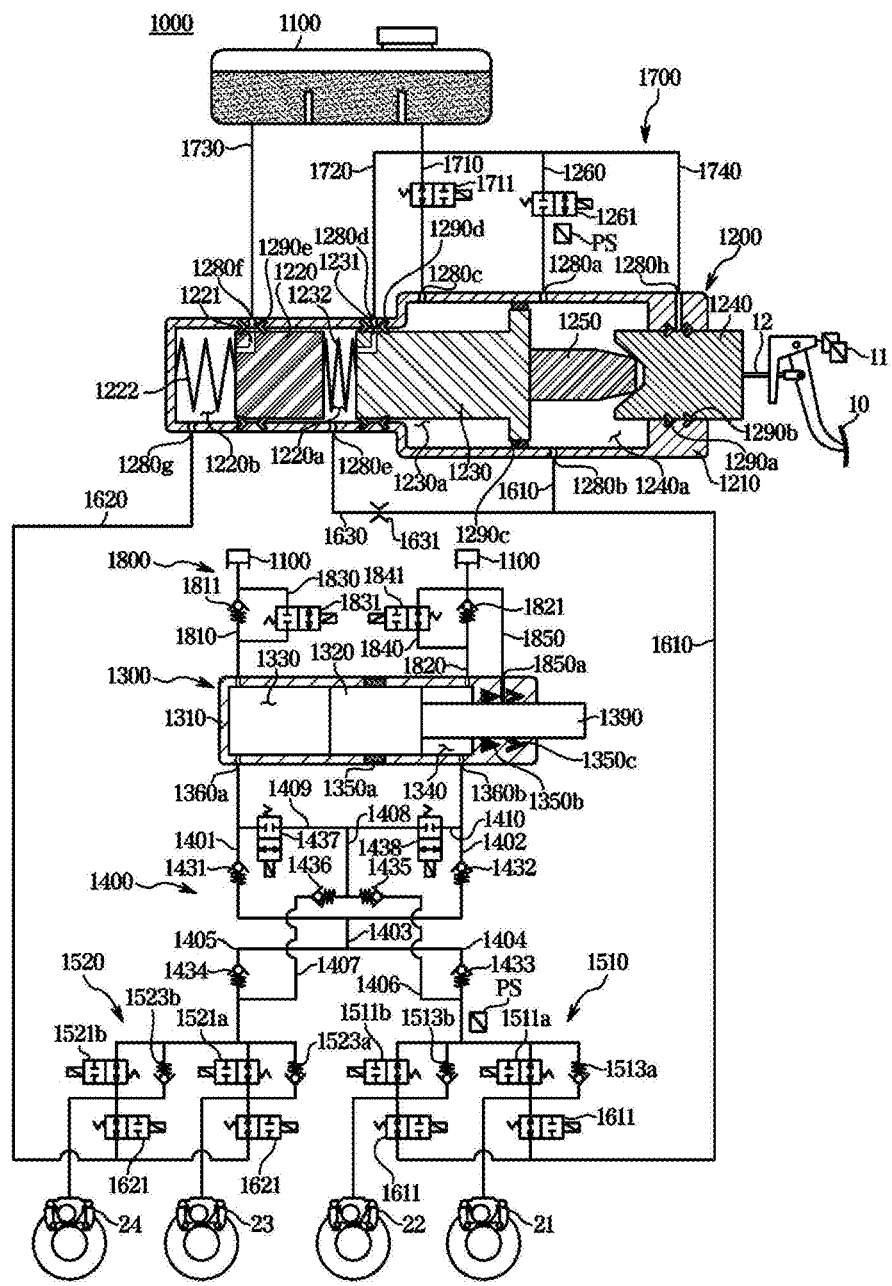

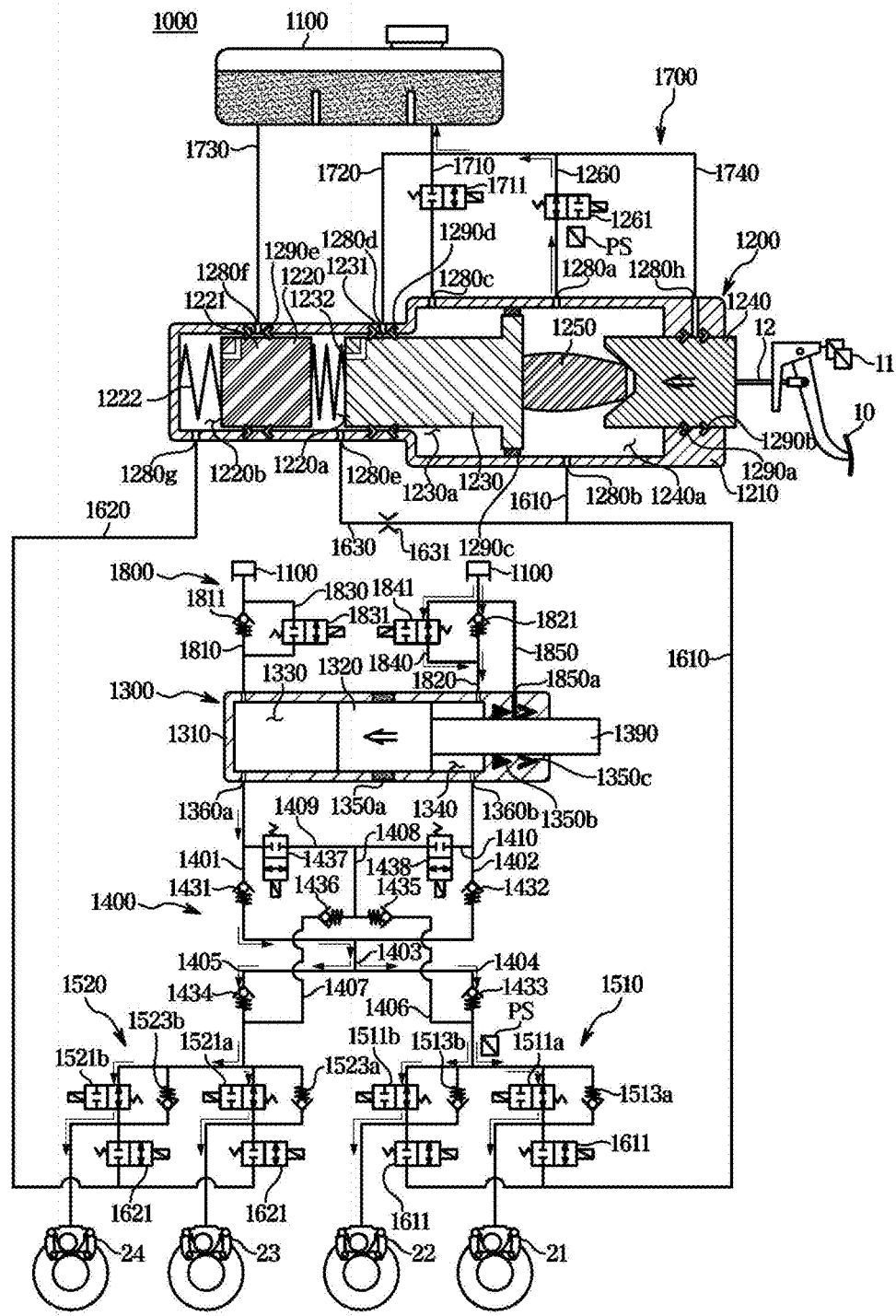
[Fig. 2]

[Fig. 3]
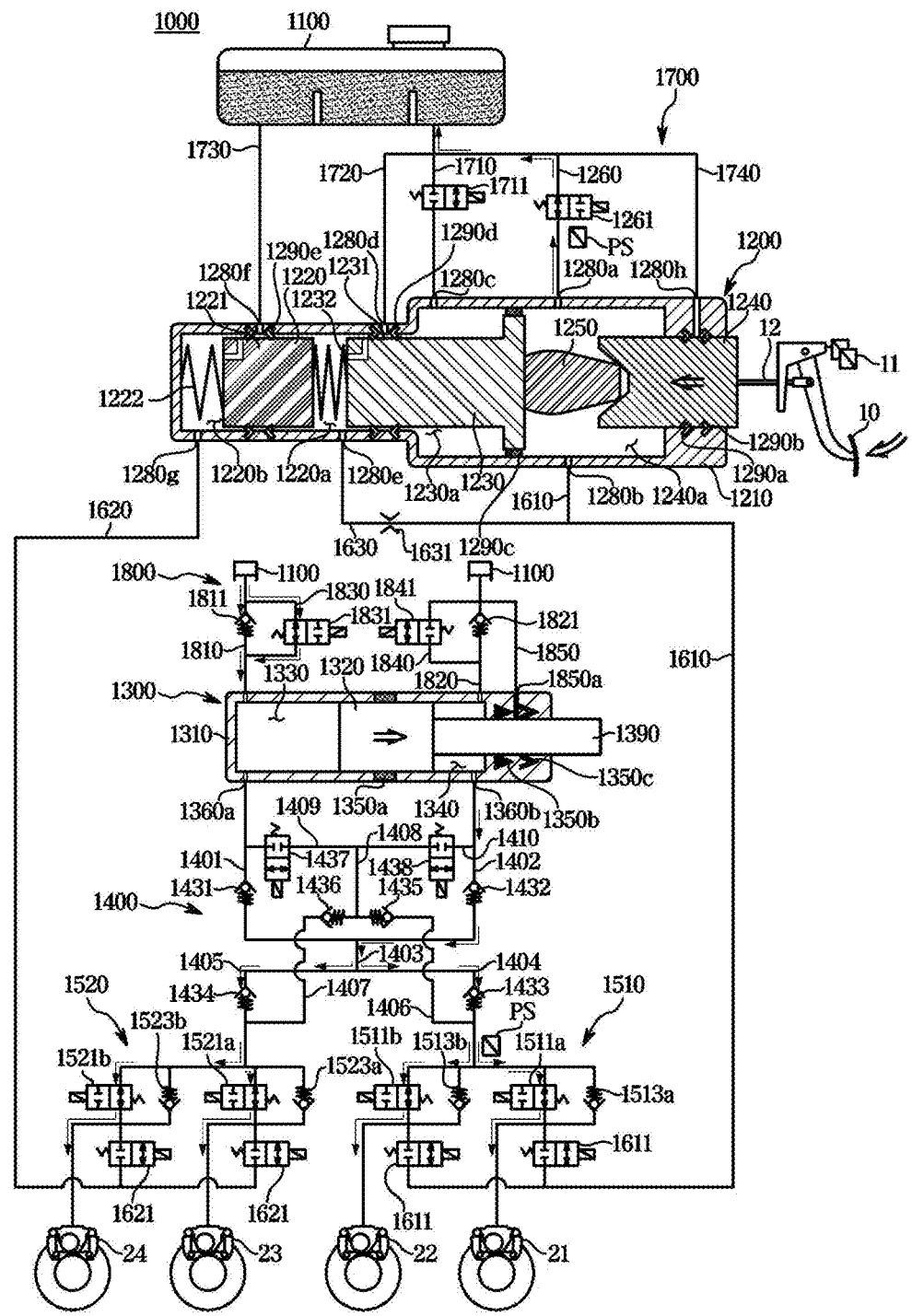

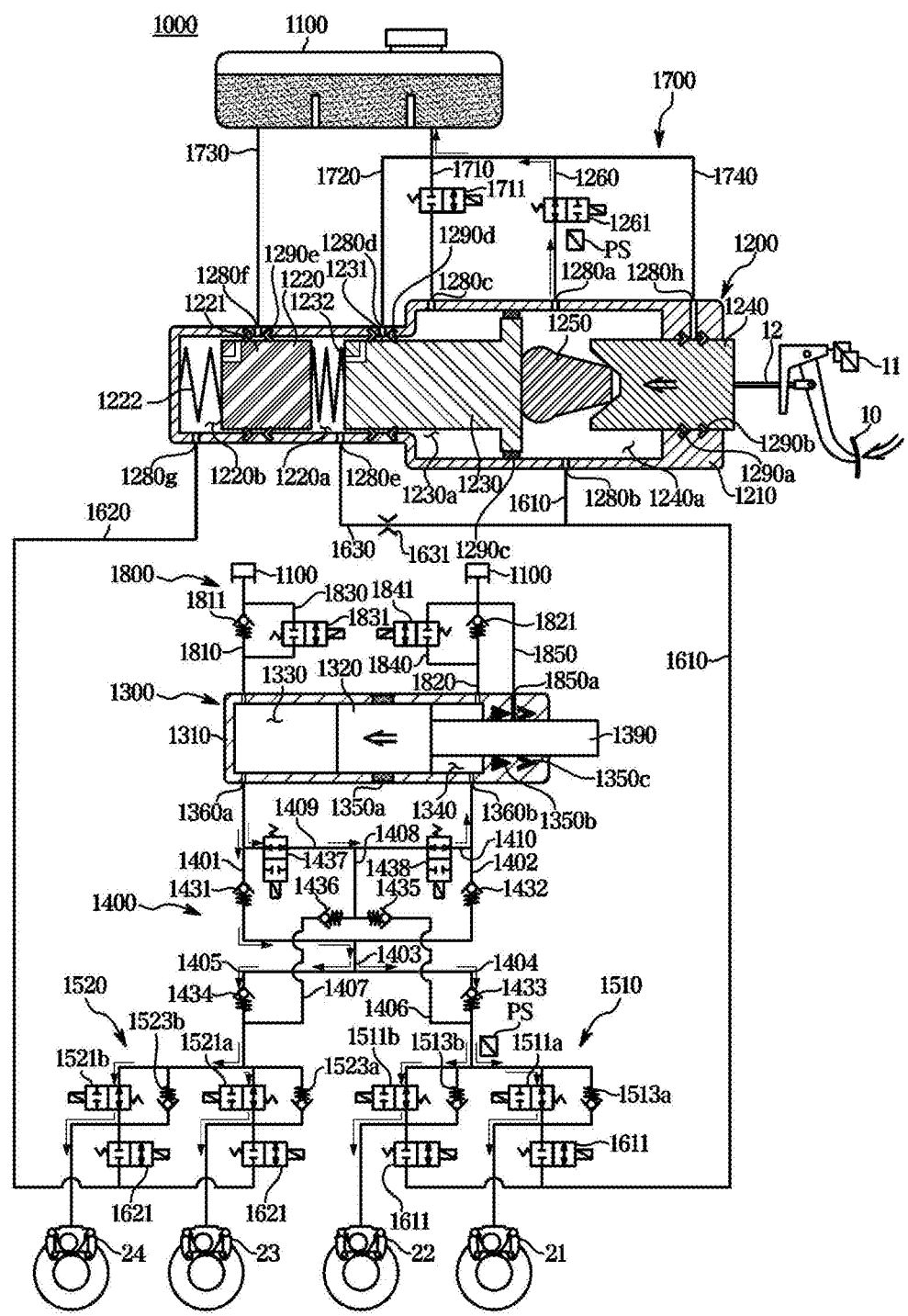
[Fig. 4]

[Fig. 5]
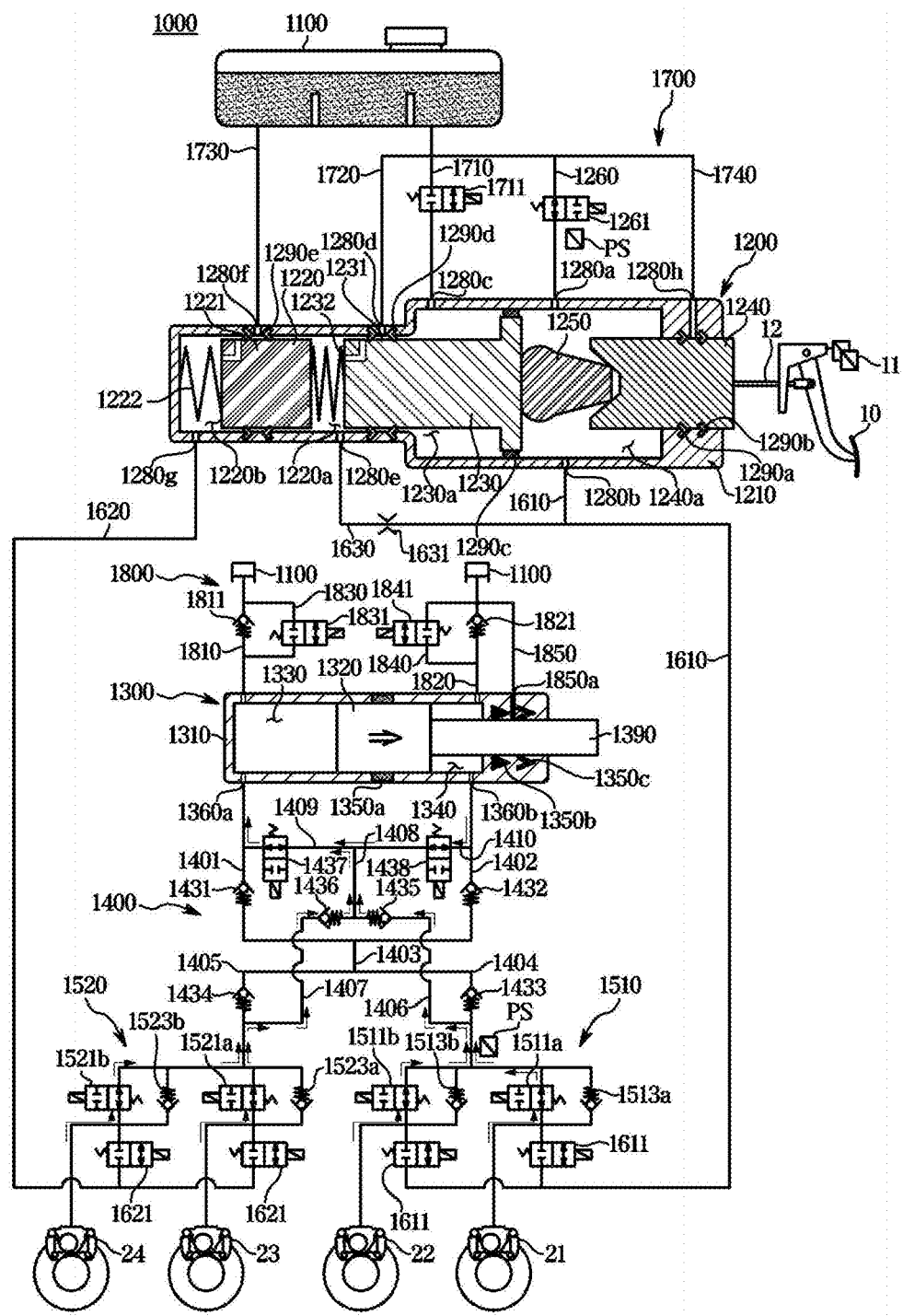

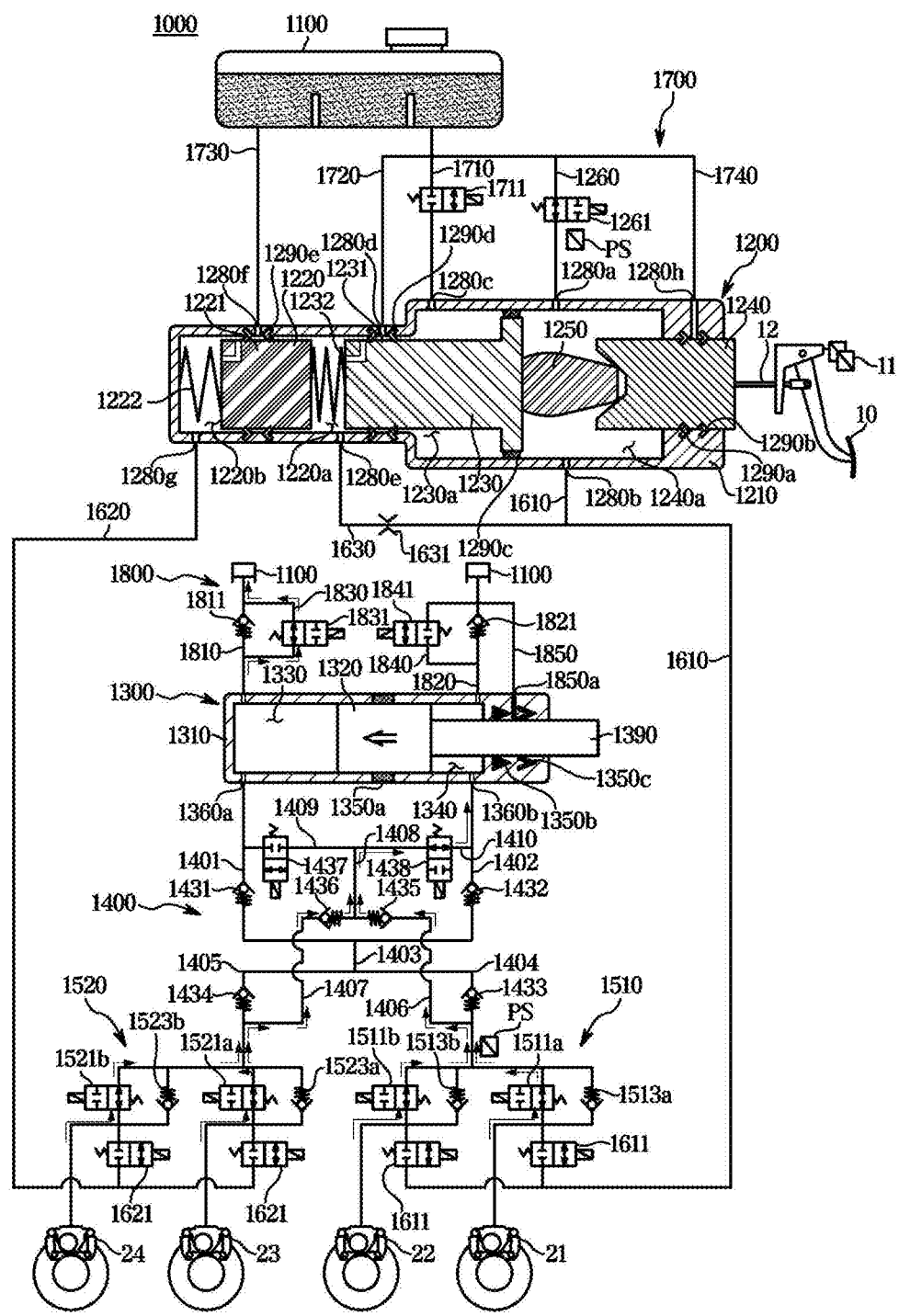
[Fig. 6]

[Fig. 7]
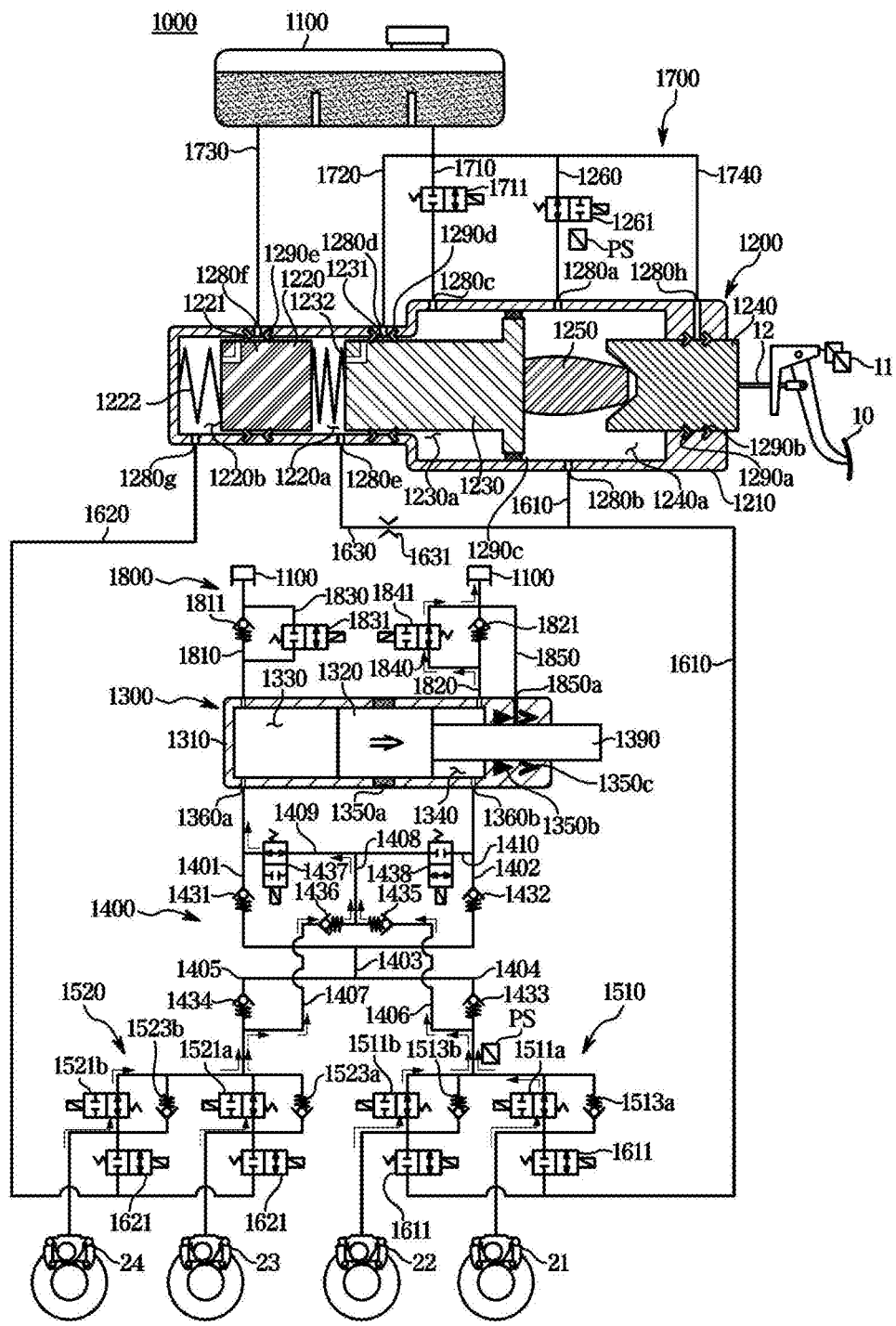

[Fig. 8]
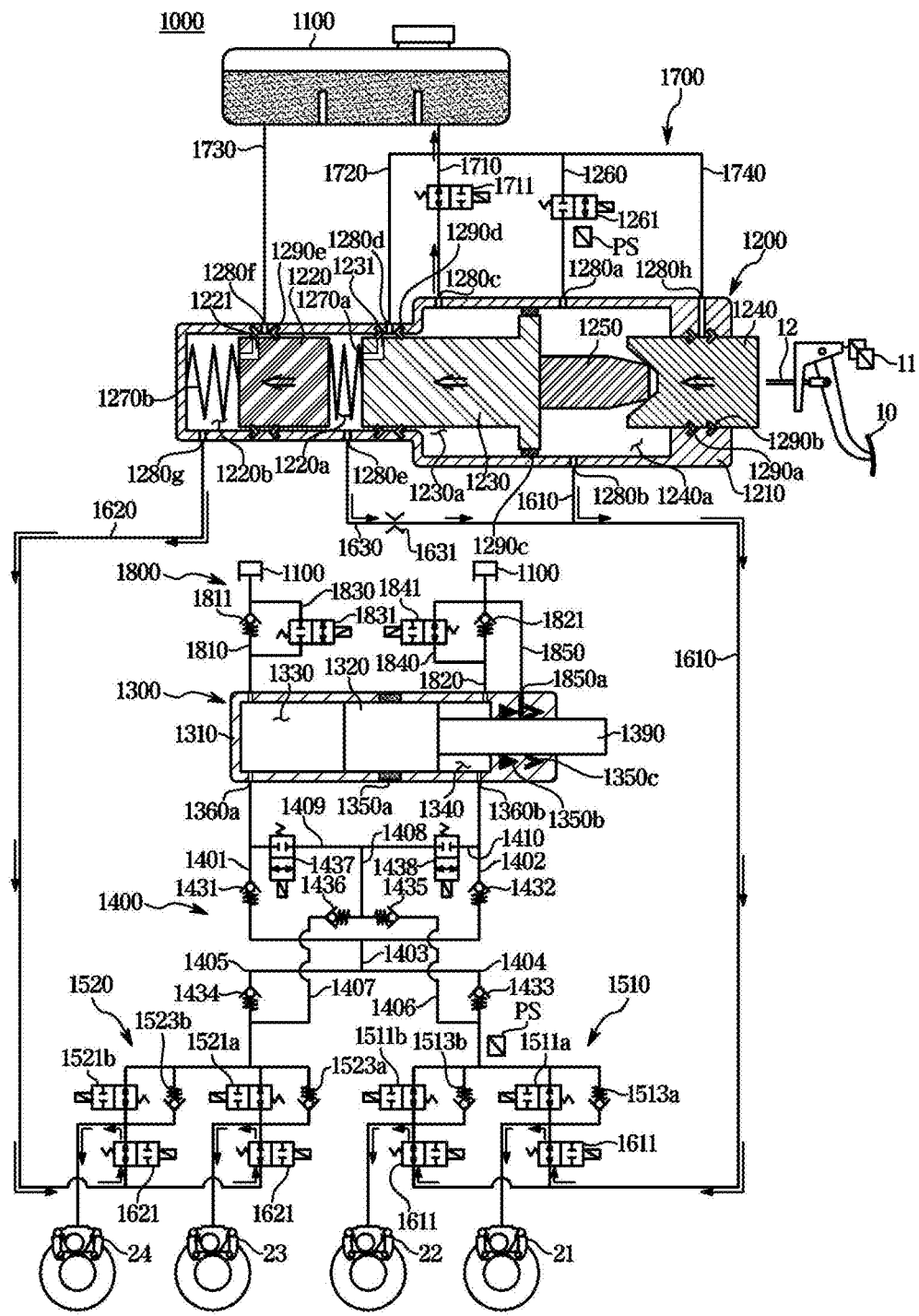

[Fig. 9]
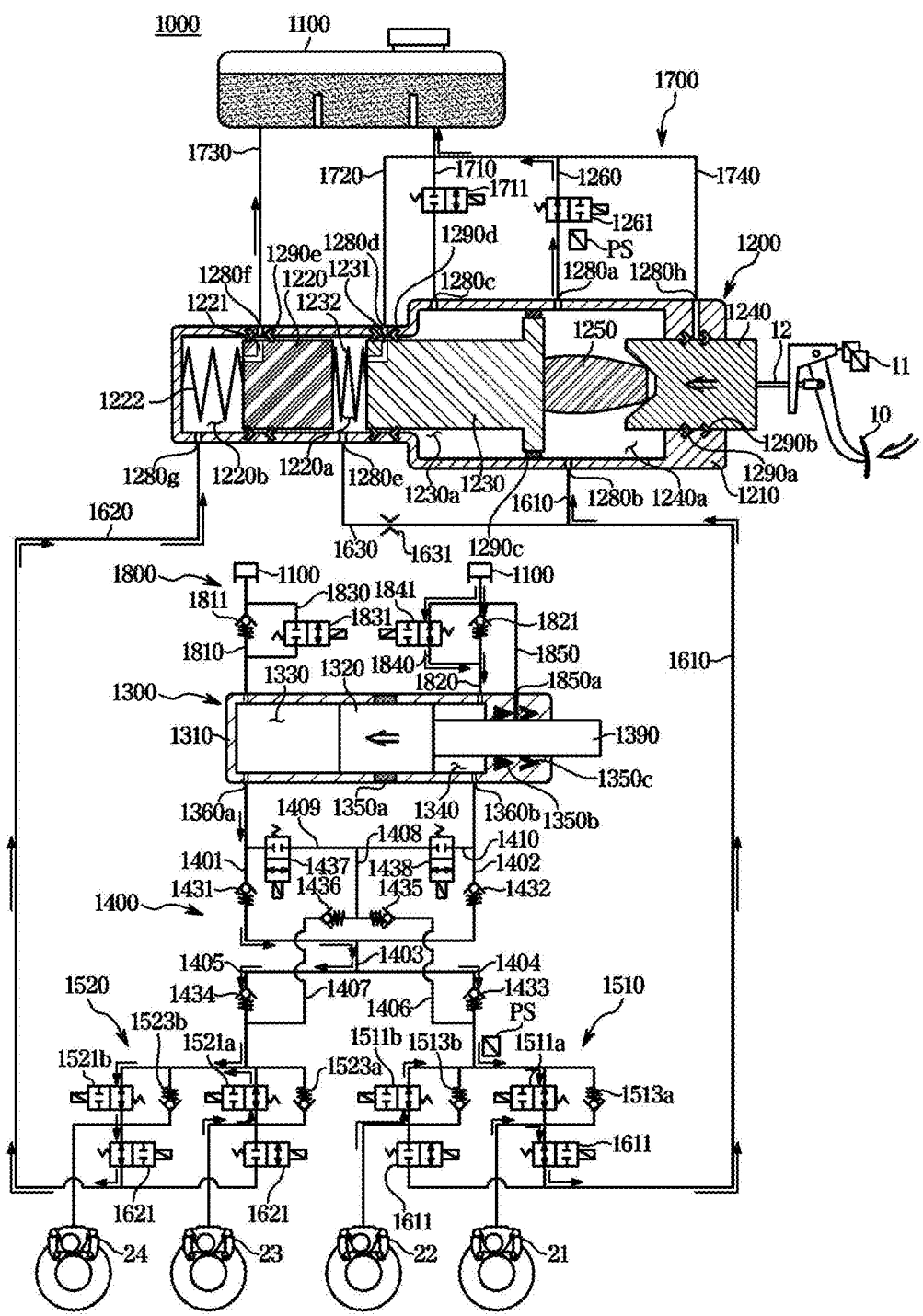

[Fig. 10]
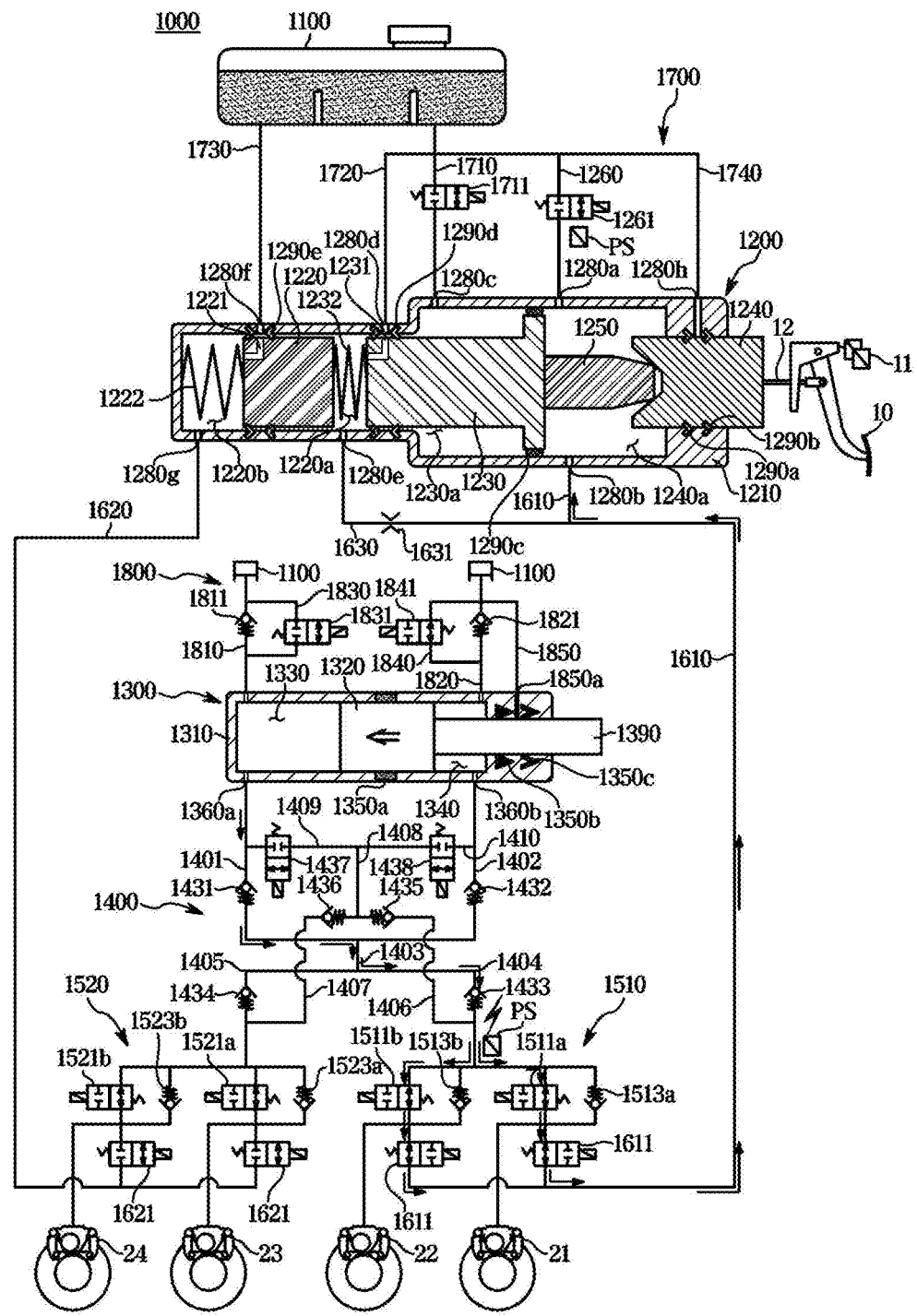

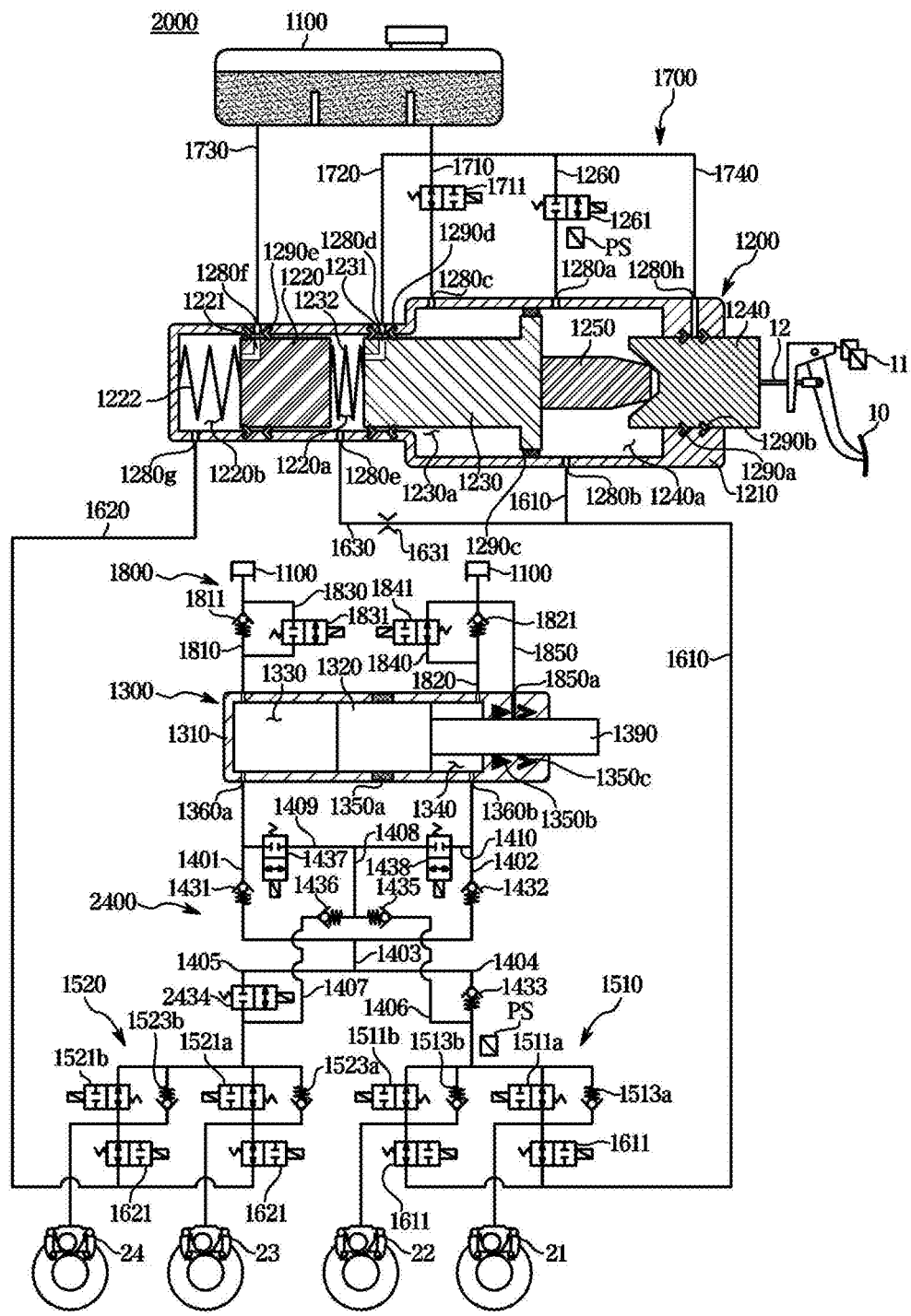
[Fig. 11]

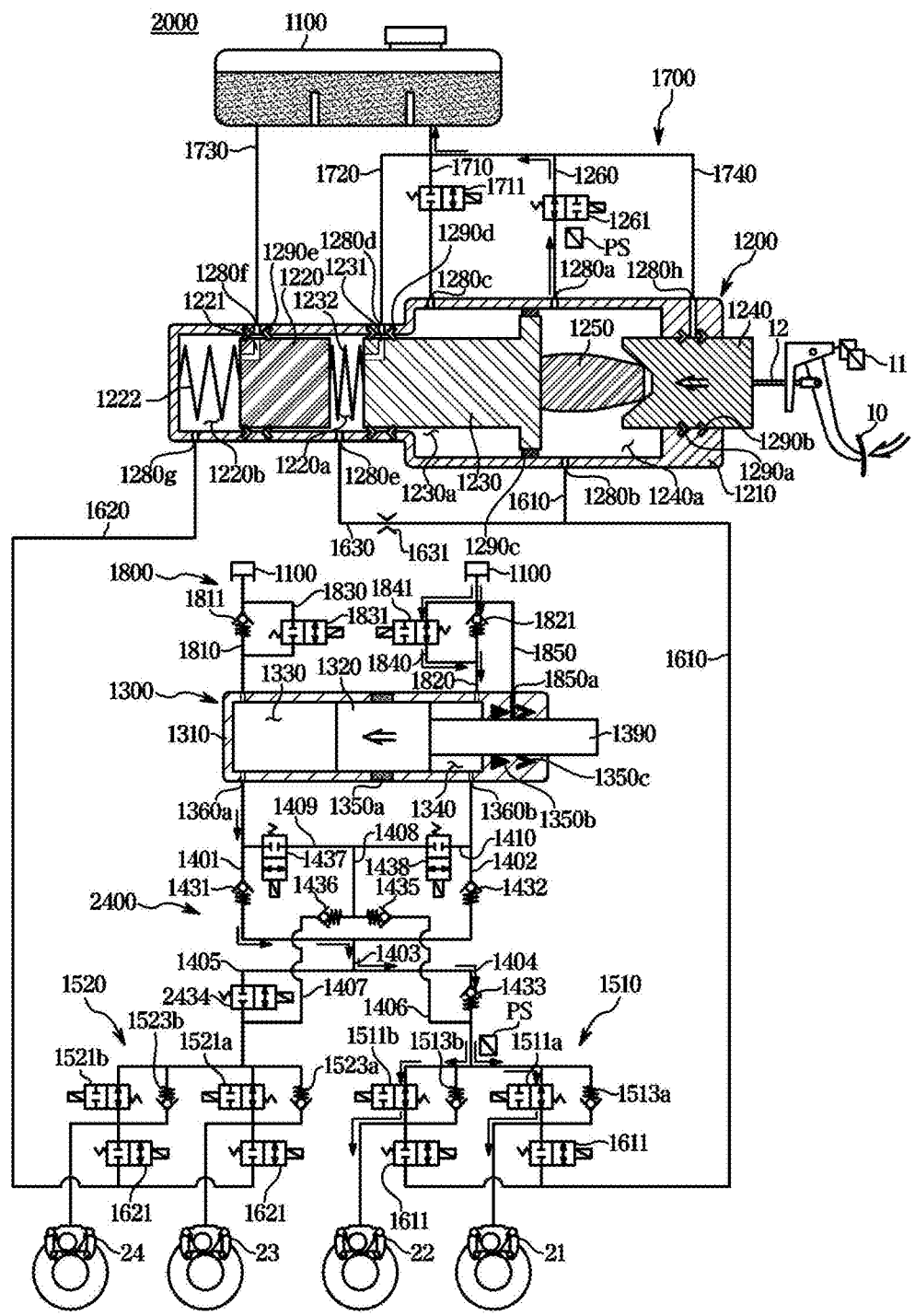
[Fig. 12]

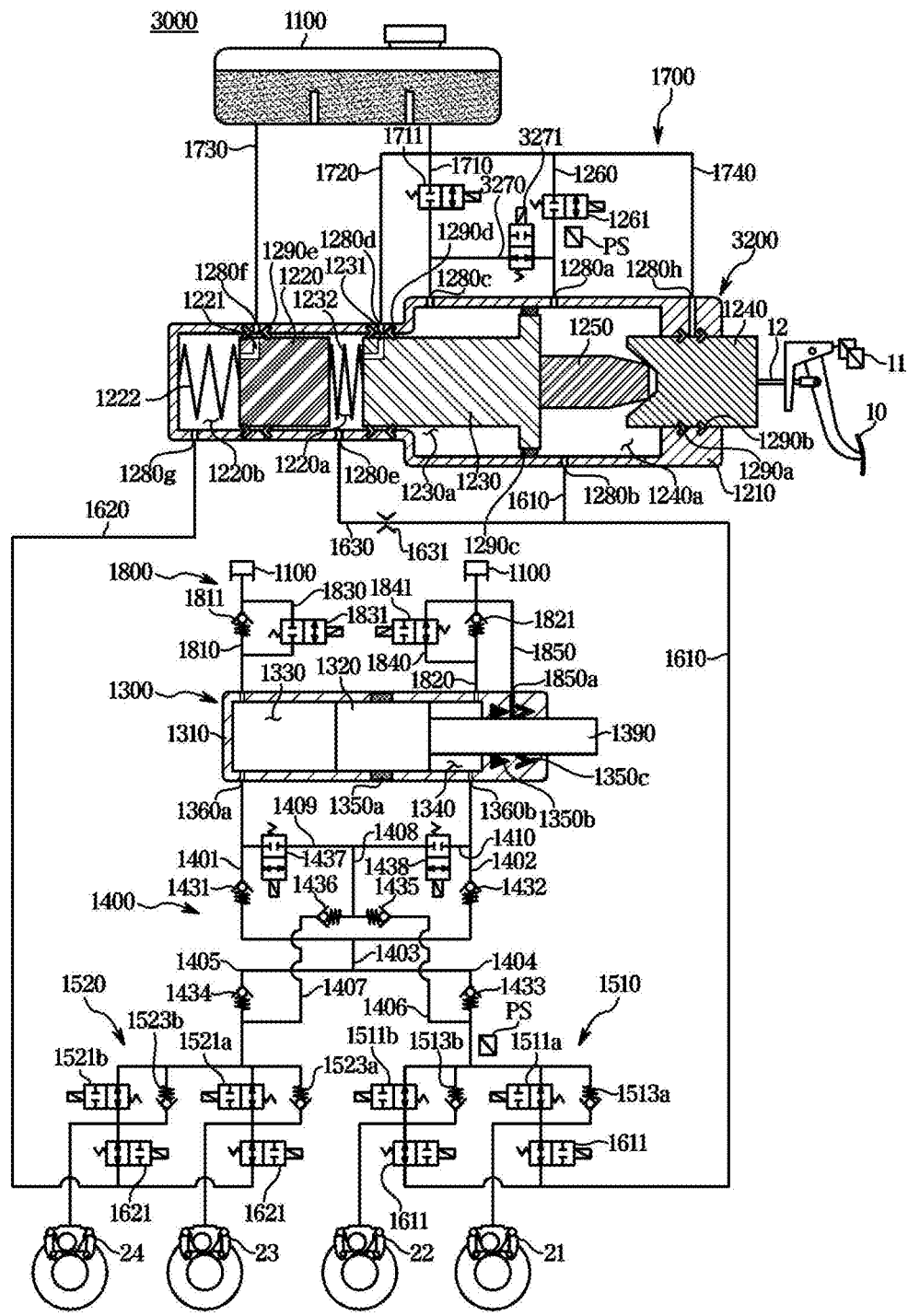
[Fig. 13]

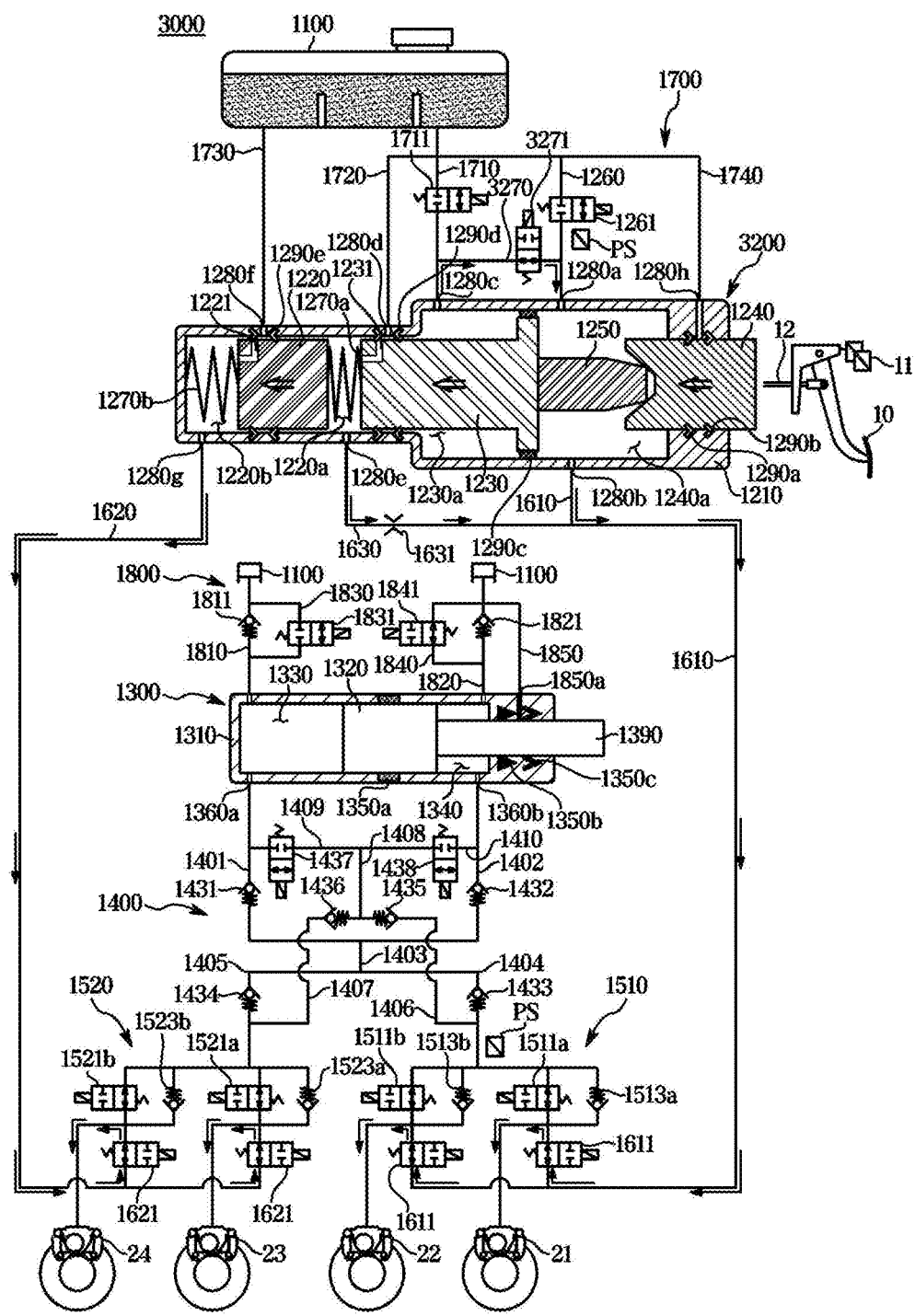
[Fig. 14]

[Fig. 15]
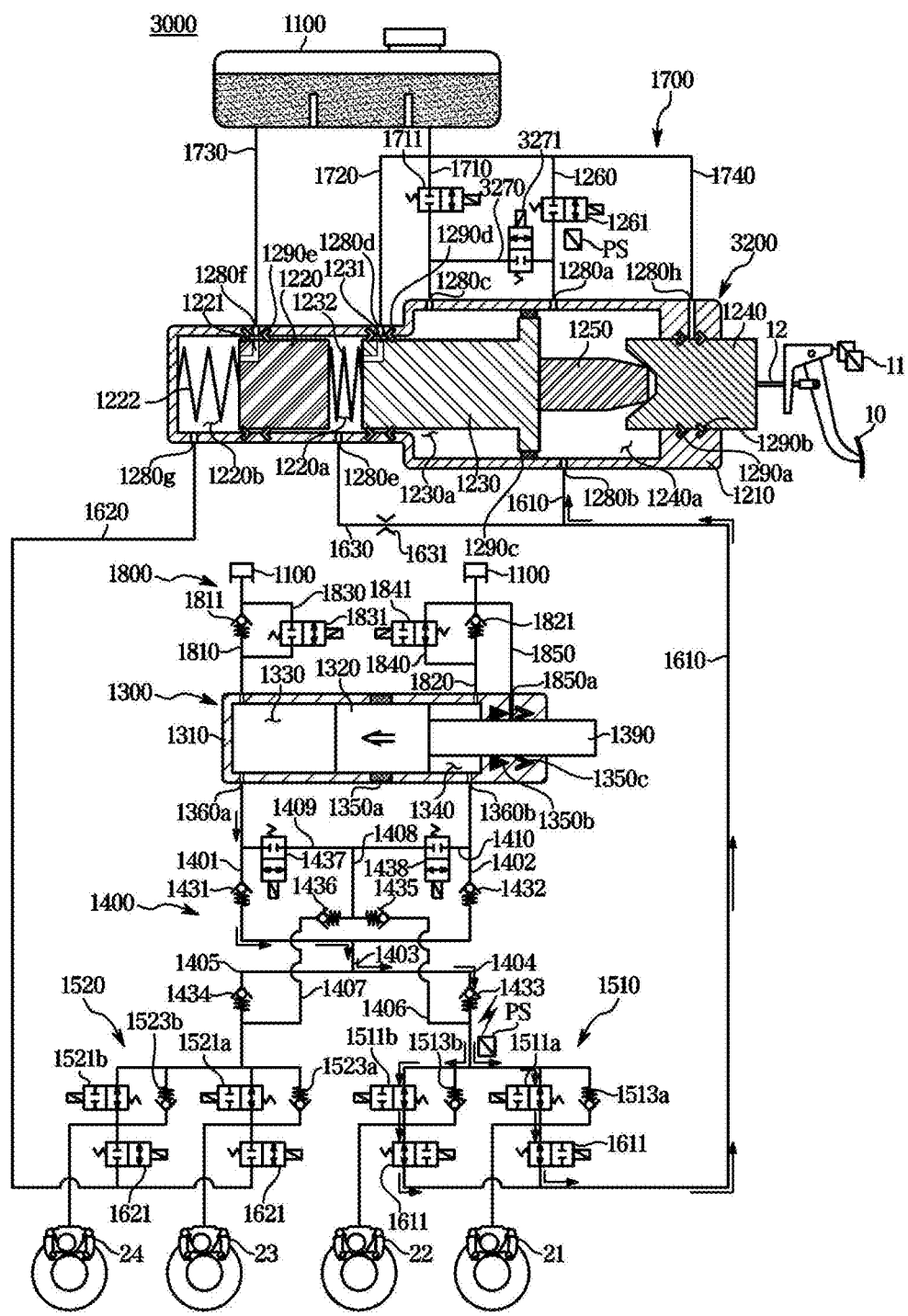

ELECTRIC BRAKE SYSTEM AND OPERATION METHOD

CROSS-REFERENCE TO RELATED APPLICATIONS

This application is the national stage of International Application No. PCT/KR2020/005811, filed on Apr. 29, 2020, which claims the priority benefit under 35 U.S.C § 119(a) of Patent Application No. 10-2019-0064832, filed on May 31, 2019 in Korea, the entire contents of which are incorporated herein by reference.

TECHNICAL FIELD

The disclosure relates to an electronic brake system and an operation method thereof, and more specifically, to an electronic brake system and an operation method thereof for generating a braking force using an electrical signal corresponding to a displacement of a brake pedal.

BACKGROUND ART

A brake system for braking of a vehicle is essentially mounted to a vehicle, and a variety of brake systems have been recently proposed for the safety of drivers and passengers.

In a conventional brake system, when a driver operates a brake pedal, hydraulic pressure for braking is supplied to wheel cylinders using a booster mechanically connected to the brake pedal. Due to the high market demand for various brake functions, however, an electronic brake system provided with a hydraulic pressure supply device and an operation method thereof have recently come into widespread use. Once a driver operates a brake pedal, the hydraulic pressure supply device of the electronic brake system detects a displacement of the brake pedal through a pedal displacement sensor, and receives an electrical signal indicating the driver's braking intention from the pedal displacement sensor, such that the hydraulic pressure required for braking is supplied to wheel cylinders.

In the electronic brake system and operation method thereof described above, in a normal operation mode, an electrical signal is generated and provided when a driver depresses the brake pedal, and the hydraulic pressure supply device electrically operates and is controlled based on the electrical signal to generate and transfer hydraulic pressure required for braking to the wheel cylinders. As described above, since the electronic brake system and operation method thereof are electrically operated and controlled, complicated and various braking operations may be performed. However, when a technical malfunction occurs in an electric component, a hydraulic pressure required for braking is not stably generated, which may threaten the safety of passengers. Accordingly, when a component fails or becomes out of control, the electronic brake system enters an abnormal operation mode, and in this case, a mechanism in which a driver's brake pedal operation is directly linked to the wheel cylinders is required. That is, in the abnormal operation mode of the electronic brake system and operation method thereof, when the driver depresses the brake pedal, a hydraulic pressure required for braking is required to be immediately generated and transferred directly to the wheel cylinders.

DISCLOSURE

Technical Problem

An embodiment of the disclosure provides an electronic brake system and an operation method thereof that may reduce the number of components and implement product miniaturization and weight reduction by integrating a master cylinder and a simulation apparatus into one.

An embodiment of the disclosure provides an electronic brake system and an operation method thereof that may implement stable and effective braking even in various operating situations.

An embodiment of the disclosure provides an electronic brake system and an operation method thereof that may stably generate a high braking pressure.

An embodiment of the disclosure provides an electronic brake system and an operation method thereof that may improve a performance and operational reliability.

An embodiment of the disclosure provides an electronic brake system and an operation method thereof that may improve ease of assembly and productivity of a product, as well as reducing manufacturing costs.

Technical Solution

According to an aspect of the disclosure, there is provided an electronic brake system, including: a reservoir in which a pressurized medium is stored; an integrated master cylinder including a first simulation chamber, a second simulation chamber, a first master chamber and a second master chamber having a smaller diameter than the second simulation chamber, a first simulation piston provided to pressurize the first simulation chamber and be displaceable by a brake pedal, a second simulation piston provided to pressurize the second simulation chamber and the first master chamber and be displaceable by a displacement of the first simulation piston or a hydraulic pressure of the first simulation chamber, a master piston provided to pressurize the second master chamber and be displaceable by a displacement of the second simulation piston or a hydraulic pressure of the first master chamber, an elastic member provided between the first simulation piston and the second simulation piston, a first simulation flow path to connect the first simulation chamber and the reservoir, and a first simulator valve provided in the first simulation flow path to control a flow of the pressurized medium; a reservoir flow path to connect the integrated master cylinder and the reservoir; a hydraulic pressure supply device configured to generate a hydraulic pressure by operating a hydraulic piston according to an electrical signal output in response to a displacement of the brake pedal, and including a first pressure chamber provided on one side of the hydraulic piston accommodated to be movable in a cylinder block and connected to one or more wheel cylinders, and a second pressure chamber provided on another side of the hydraulic piston and connected to the one or more wheel cylinders; a hydraulic control unit having a first hydraulic circuit configured to control a hydraulic pressure transferred to two wheel cylinders and a second hydraulic circuit configured to control a hydraulic pressure transferred to other two wheel cylinders; and an electronic control unit configured to control valves based on hydraulic pressure information and displacement information of the brake pedal, wherein the hydraulic control unit includes a first hydraulic flow path in communication with the first pressure chamber, a second hydraulic flow path in communication with the second pressure chamber, a third hydraulic flow path in which the first hydraulic flow path and the second hydraulic flow path join, a fourth hydraulic flow path branched from the third hydraulic flow path and connected to the first hydraulic circuit, a fifth hydraulic flow path branched from the third hydraulic flow path and connected to the second hydraulic circuit, a sixth hydraulic flow path in communication with the first hydraulic circuit, a seventh hydraulic flow path in communication with the second hydraulic circuit, an eighth hydraulic flow path in which the sixth hydraulic flow path and the seventh hydraulic flow path join, a ninth hydraulic flow path branched from the eight hydraulic flow path and connected to the first pressure chamber, and a tenth hydraulic flow path branched from the eight hydraulic flow path and connected to the second pressure chamber.

There is provided an electronic brake system, including: a reservoir in which a pressurized medium is stored; an integrated master cylinder having a master chamber and a simulation chamber to provide a driver with a reaction force corresponding to a pressing force of a brake pedal, and at the same time to pressurize and discharge a pressurized medium accommodated therein; a reservoir flow path to connect the integrated master cylinder and the reservoir; a hydraulic pressure supply device configured to generate a hydraulic pressure by operating a hydraulic piston according to an electrical signal output in response to a displacement of the brake pedal, and including a first pressure chamber provided on one side of the hydraulic piston accommodated to be movable in a cylinder block and connected to one or more wheel cylinders, and a second pressure chamber provided on another side of the hydraulic piston and connected to the one or more wheel cylinders; a hydraulic control unit having a first hydraulic circuit configured to control a hydraulic pressure transferred to two wheel cylinders and a second hydraulic circuit configured to control a hydraulic pressure transferred to other two wheel cylinders; and an electronic control unit configured to control valves based on hydraulic pressure information and displacement information of the brake pedal, wherein the hydraulic control unit includes a first hydraulic flow path in communication with the first pressure chamber, a second hydraulic flow path in communication with the second pressure chamber, a third hydraulic flow path in which the first hydraulic flow path and the second hydraulic flow path join, a fourth hydraulic flow path branched from the third hydraulic flow path and connected to the first hydraulic circuit, a fifth hydraulic flow path branched from the third hydraulic flow path and connected to the second hydraulic circuit, a sixth hydraulic flow path in communication with the first hydraulic circuit, a seventh hydraulic flow path in communication with the second hydraulic circuit, an eighth hydraulic flow path in which the sixth hydraulic flow path and the seventh hydraulic flow path join, a ninth hydraulic flow path branched from the eight hydraulic flow path and connected to the first pressure chamber, and a tenth hydraulic flow path branched from the eight hydraulic flow path and connected to the second pressure chamber.

The hydraulic control unit includes a first valve provided in the first hydraulic flow path to control the flow of the pressurized medium, a second valve provided in the second hydraulic flow path to control the flow of the pressurized medium, a third valve provided in the fourth hydraulic flow path to control the flow of the pressurized medium, a fourth valve provided in the fifth hydraulic flow path to control the flow of the pressurized medium, a fifth valve provided in the sixth hydraulic flow path to control the flow of the pressurized medium, a sixth valve provided in the seventh hydraulic flow path to control the flow of the pressurized medium, a seventh valve provided in the ninth hydraulic flow path to control the flow of the pressurized medium, and an eighth valve provided in the tenth hydraulic flow path to control the flow of the pressurized medium.

The first valve is provided as a check valve that allows only the flow of the pressurized medium discharged from the first pressure chamber, the second valve is provided as a check valve that allows only the flow of the pressurized medium discharged from the second pressure chamber, the third valve is provided as a check valve that allows only the flow of the pressurized medium from the third hydraulic flow path to the first hydraulic circuit, the fourth valve is provided as a check valve that allows only the flow of the pressurized medium from the third hydraulic flow path to the second hydraulic circuit, the fifth valve is provided as a check valve that allows only the flow of the pressurized medium discharged from the first hydraulic circuit, the sixth valve is provided as a check valve that allows only the flow of the pressurized medium discharged from the second hydraulic circuit, and the seventh valve and the eighth valve are provided as solenoid valves that control the flow of the pressurized medium in both directions.

The electronic brake system further includes a dump control unit provided between the reservoir and the hydraulic pressure supply device to control the flow of the pressurized medium, wherein the dump control unit includes a first dump flow path to connect the first pressure chamber and the reservoir, a first dump check valve provided in the first dump flow path and allowing only the flow of the pressurized medium from the reservoir to the first pressure chamber, a first bypass flow path connected in parallel to the first dump check valve on the first dump flow path, a first dump valve provided in the first bypass flow path to control the flow of the pressurized medium in both directions, a second dump flow path to connect the second pressure chamber and the reservoir, a second dump check valve provided in the second dump flow path and allowing only the flow of the pressurized medium from the reservoir to the second pressure chamber, a second bypass flow path connected in parallel to the second dump check valve on the second dump flow path, and a second dump valve provided in the second bypass flow path to control the flow of the pressurized medium in both directions.

The simulation chamber includes a first simulation chamber and a second simulation chamber, the master chamber includes a first master chamber and a second master chamber having a smaller diameter than the second simulation chamber, and the integrated master cylinder includes a first simulation piston provided to pressurize the first simulation chamber and be displaceable by the brake pedal, a second simulation piston provided to pressurize the second simulation chamber and the first master chamber and be displaceable by a displacement of the first simulation piston and a hydraulic pressure of the first simulation chamber, a master piston provided to pressurize the second master chamber and be displaceable by a displacement of the second simulation piston and a hydraulic pressure of the first master chamber, an elastic member provided between the first simulation piston and the second simulation piston, a simulation flow path to connect the first simulation chamber and the reservoir, and a simulator valve provided in the simulation flow path to control the flow of the pressurized medium.

The electronic brake system further includes a first backup flow path to connect the first simulation chamber and the first hydraulic circuit; a second backup flow path to connect the second master chamber and the second hydraulic circuit; an auxiliary backup flow path to connect the first master chamber and the first backup flow path; at least one first cut valve provided in the first backup flow path to control the flow of the pressurized medium; and at least one second cut valve provided in the second backup flow path to control the flow of the pressurized medium.

The reservoir flow path includes a first reservoir flow path including a reservoir valve to communicate the reservoir and the second simulation chamber and control the flow of the pressurized medium, a second reservoir flow path to communicate the reservoir and the first master chamber, and a third reservoir flow path to communicate the reservoir and the second master chamber.

The first hydraulic circuit includes a first inlet valve and a second inlet valve to control the flow of the pressurized medium supplied to a first wheel cylinder and a second wheel cylinder, respectively, and the second hydraulic circuit includes a third inlet valve and a fourth inlet valve to control the flow of the pressurized medium supplied to a third wheel cylinder and a fourth wheel cylinder, respectively.

The first valve is provided as a check valve that allows only the flow of the pressurized medium discharged from the first pressure chamber, the second valve is provided as a check valve that allows only the flow of the pressurized medium discharged from the second pressure chamber, the third valve is provided as a check valve that allows only the flow of the pressurized medium from the third hydraulic flow path to the first hydraulic circuit, the fifth valve is provided as a check valve that allows only the flow of the pressurized medium discharged from the first hydraulic circuit, the sixth valve is provided as a check valve that allows only the flow of the pressurized medium discharged from the second hydraulic circuit, and the fourth valve, the seventh valve and the eighth valve are provided as solenoid valves that control the flow of the pressurized medium in both directions.

The first hydraulic circuit includes a first wheel cylinder and a second wheel cylinder, and the second hydraulic circuit includes a third wheel cylinder and a fourth wheel cylinder, and the electronic brake system further includes: a generator provided in the third wheel cylinder and the fourth wheel cylinder, respectively.

The integrated master cylinder further includes a second simulation flow path to connect the first simulation chamber and the second simulation chamber, and the second simulation flow path includes a second simulator valve to control the flow of the pressurized medium.

There is provided an operation method of an electronic brake system, including: as the hydraulic pressure transferred from the hydraulic pressure supply device to the wheel cylinders gradually increases, a first braking mode in which the hydraulic pressure is primarily provided, a second braking mode in which the hydraulic pressure is secondly provided by a forward movement of the hydraulic piston, and a third braking mode in which the hydraulic pressure is thirdly provided by a forward movement of the hydraulic piston after the second braking mode.

In the first braking mode, the eighth valve and the first dump valve are closed, and a hydraulic pressure generated in the first pressure chamber by the forward movement of the hydraulic piston is provided to the first hydraulic circuit by sequentially passing through the first hydraulic flow path, the third hydraulic flow path, and the fourth hydraulic flow path, and is provided to the second hydraulic circuit by sequentially passing through the first hydraulic flow path, the third hydraulic flow path, and the fifth hydraulic flow path.

In the second braking mode, the seventh valve and the second dump valve are closed, and a hydraulic pressure generated in the second pressure chamber by a backward movement of the hydraulic piston after the first braking mode is provided to the first hydraulic circuit by sequentially passing through the second hydraulic flow path, the third hydraulic flow path and the fourth hydraulic flow path, and is provided to the second hydraulic circuit by sequentially passing through the second hydraulic flow path, the third hydraulic flow path and the fifth hydraulic flow path.

In the third braking mode, the seventh valve and the eighth valve are open, the first dump valve and the second dump valve are closed, a portion of the hydraulic pressure generated in the first pressure chamber by the forward movement of the hydraulic piston is provided to the first hydraulic circuit by sequentially passing through the first hydraulic flow path, the third hydraulic flow path and the fourth hydraulic flow path, and is provided to the second hydraulic circuit by sequentially passing through the first hydraulic flow path, the third hydraulic flow path and the fifth hydraulic flow path, and a remaining portion of the hydraulic pressure generated in the first pressure chamber is provided to the second pressure chamber by sequentially passing through the ninth hydraulic flow path and the tenth hydraulic flow path.

When the first braking mode is released, the seventh valve and the second dump valve are open, the eighth valve and the first dump valve are closed, a negative pressure is generated in the first pressure chamber by a backward movement of the hydraulic piston, the pressurized medium provided to the first hydraulic circuit is recovered to the first pressure chamber by sequentially passing through the sixth hydraulic flow path, the eighth hydraulic flow path and the ninth hydraulic flow path, and the pressurized medium provided to the second hydraulic circuit is recovered to the first pressure chamber by sequentially passing through the seventh hydraulic flow path, the eighth hydraulic flow path and the ninth hydraulic flow path.

When the second braking mode is released, the eighth valve and the first dump valve are open, the seventh valve and the second dump valve are closed, a negative pressure is generated in the second pressure chamber by the forward movement of the hydraulic piston, the pressurized medium provided to the first hydraulic circuit is recovered to the second pressure chamber by sequentially passing through the sixth hydraulic flow path, the eighth hydraulic flow path and the tenth hydraulic flow path, and the pressurized medium provided to the second hydraulic circuit is recovered to the second pressure chamber by sequentially passing through the seventh hydraulic flow path, the eighth hydraulic flow path and the tenth hydraulic flow path.

When the third braking mode is released, the seventh valve and the eighth valve are open, the first dump valve is closed, a negative pressure is generated in the first pressure chamber by the backward movement of the hydraulic piston, the pressurized medium provided to the first hydraulic circuit is recovered to the first pressure chamber by sequentially passing through the sixth hydraulic flow path, the eighth hydraulic flow path and the ninth hydraulic flow path, the pressurized medium provided to the second hydraulic circuit is recovered to the first pressure chamber by sequentially passing through the seventh hydraulic flow path, the eighth hydraulic flow path and the ninth hydraulic flow path, and at least a portion of the pressurized medium in the second pressure chamber is supplied to the first pressure chamber by sequentially passing through the tenth hydraulic flow path and the ninth hydraulic flow path.

There is provided an operation method of an electronic brake system, wherein, in a regenerative braking mode by the generator, a hydraulic pressure generated in the first pressure chamber by a forward movement of the hydraulic piston is provided to the first hydraulic circuit by sequentially passing through the first hydraulic flow path, the third hydraulic flow path and the fourth hydraulic flow path, and is prevented to be provided to the third wheel cylinder and the fourth wheel cylinder by closing the fourth valve.

Advantageous Effects

According to the embodiment of the disclosure, an electronic brake system and an operation method thereof can reduce the number of components and implement product miniaturization and weight reduction.

According to the embodiment of the disclosure, the electronic brake system and the operation method thereof can implement stable and effective braking even in various operating situations.

According to the embodiment of the disclosure, the electronic brake system and the operation method thereof can stably generate a high braking pressure.

According to the embodiment of the disclosure, the electronic brake system and the operation method thereof can improve a performance and operational reliability.

According to the embodiment of the disclosure, the electronic brake system and the operation method thereof can stably provide a braking pressure even when a component fails or a pressurized medium leaks.

According to the embodiment of the disclosure, the electronic brake system and the operation method thereof can improve ease of assembly and productivity of a product, as well as reducing manufacturing costs.

DESCRIPTION OF DRAWINGS

FIG. 1 is a hydraulic circuit diagram illustrating an electronic brake system according to a first embodiment of the disclosure.

FIG. 2 is a hydraulic circuit diagram illustrating that the electronic brake system according to the first embodiment of the disclosure performs a first braking mode.

FIG. 3 is a hydraulic circuit diagram illustrating that the electronic brake system according to the first embodiment of the disclosure performs a second braking mode.

FIG. 4 is a hydraulic circuit diagram illustrating that the electronic brake system according to the first embodiment of the disclosure performs a third braking mode.

FIG. 5 is a hydraulic circuit diagram illustrating that the electronic brake system according to the first embodiment of the disclosure operates to release the third braking mode.

FIG. 6 is a hydraulic circuit diagram illustrating that the electronic brake system according to the first embodiment of the disclosure operates to release the second braking mode.

FIG. 7 is a hydraulic circuit diagram illustrating that the electronic brake system according to the first embodiment of the disclosure operates to release the first braking mode.

FIG. 8 is a hydraulic circuit diagram illustrating that the electronic brake system according to the first embodiment of the disclosure operates (fallback mode) in an abnormal state.

FIG. 9 is a hydraulic circuit diagram illustrating that the electronic brake system according to the first embodiment of the disclosure operates in an ABS dump mode.

FIG. 10 is a hydraulic circuit diagram illustrating that the electronic brake system according to the first embodiment of the disclosure operates in a diagnosis mode.

FIG. 11 is a hydraulic circuit diagram illustrating an electronic brake system according to a second embodiment of the disclosure.

FIG. 12 is a hydraulic circuit diagram illustrating that the electronic brake system according to the second embodiment of the disclosure operates in a regenerative braking mode.

FIG. 13 is a hydraulic circuit diagram illustrating an electronic brake system according to a third embodiment of the disclosure.

FIG. 14 is a hydraulic circuit diagram illustrating that the electronic brake system according to the third embodiment of the disclosure operates (fallback mode) in an abnormal state.

FIG. 15 is a hydraulic circuit diagram illustrating that the electronic brake system according to the third embodiment of the disclosure operates in a diagnosis mode.

BEST MODE OF THE DISCLOSURE

Hereinafter, embodiments of the present disclosure will be described in detail with reference to the accompanying drawings. The following embodiments are provided to fully convey the spirit of the disclosure to a person having ordinary skill in the art to which the present disclosure belongs. The disclosure is not limited to the embodiments shown herein but may be embodied in other forms. The drawings are not intended to limit the scope of the disclosure in any way, and the size of components may be exaggerated for clarity of illustration.

FIG. 1 is a hydraulic circuit diagram illustrating an electronic brake system 1000 according to a first embodiment of the disclosure.

Referring to FIG. 1, the electronic brake system 1000 includes a reservoir 1100, an integrated master cylinder 1200, a hydraulic pressure supply device 1300, a hydraulic control unit 1400, hydraulic circuits 1510 and 1520, a dump control unit 1800, backup flow paths 1610, 1620 and 1630, a reservoir flow path 1700, and an electronic control unit (ECU, not shown). A pressurized medium is stored in the reservoir 1100. The integrated master cylinder 1200 provides a driver with a reaction force corresponding to a pressing force of a brake pedal 10 and pressurizes and discharges a pressurized medium accommodated therein such as a brake oil, etc. The hydraulic pressure supply device 1300 receives an electrical signal corresponding to a driver's braking intention from a pedal displacement sensor 11 detecting a displacement of the brake pedal 10 and generates a hydraulic pressure of the pressurized medium through a mechanical operation. The hydraulic control unit 1400 controls the hydraulic pressure provided from the hydraulic pressure supply device 1300. The hydraulic circuits 1510 and 1520 include wheel cylinders 20 that perform braking of respective wheels RR, RL, FR and FL by receiving a hydraulic pressure of the pressurized medium. The dump control unit 1800 is provided between the hydraulic pressure supply device 1300 and the reservoir 1100 to control a flow of the pressurized medium. The backup flow paths 1610, 1620 and 1630 hydraulically connect the integrated master cylinder 1200 and the hydraulic circuits 1510 and 1520. The reservoir flow path 1700 hydraulically connects the integrated master cylinder 1200 and the reservoir 1100. The ECU controls the hydraulic pressure supply device 1300 and various valves based on hydraulic pressure information and pedal displacement information.

The integrated master cylinder 1200 includes simulation chambers 1230a and 1240a and master chambers 1220a and 1220b to, when the driver presses the brake pedal 10 for braking, provide a reaction force against the pressing to the driver to provide a stable pedal feeling, and at the same time pressurize and discharge the pressurized medium accommodated therein.

The integrated master cylinder 1200 may be divided into a pedal simulation part to provide a pedal feeling to the driver, and a master cylinder part to transfer the pressurized medium to the second hydraulic circuit 1520 to be described later. The integrated master cylinder 1200 may be configured such that the pedal simulation part and the master cylinder part are sequentially provided from the brake pedal 10 side and disposed coaxially within one cylinder block 1210.

Specifically, the integrated master cylinder 1200 includes the cylinder block 1210, the first simulation chamber 1240a, a first simulation piston 1240, the second simulation chamber 1230a, a second simulation piston 1230, the first master chamber 1220a, the second master chamber 1220b, a master piston 1220, an elastic member 1250, a simulator spring 1232, a piston spring 1222, a first simulation flow path 1260 and a first simulator valve 1261. The cylinder block 1210 has a chamber formed therein, and the first simulation chamber 1240a is formed on an inlet side of the cylinder block 1210 to which the brake pedal 10 is connected. The first simulation piston 1240 is provided in the first simulation chamber 1240a and connected to the brake pedal 10 to be displaceable by an operation of the brake pedal 10. The second simulation chamber 1230a is formed more inside than the first simulation chamber 1240a on the cylinder block 1210. The second simulation piston 1230 is provided in the second simulation chamber 1230a to be displaceable by a displacement of the first simulation piston 1240 or a hydraulic pressure of the pressurized medium accommodated in the first simulation chamber 1240a. The first master chamber 1220a and the second master chamber 1220b are formed more inside than the second simulation chamber 1230a on the cylinder block 1210 and have a smaller diameter than the second simulation chamber 1230a. The master piston 1220 is provided in the second master chamber 1220b and provided to be displaceable by a displacement of the second simulation piston 1230 and a hydraulic pressure of the pressurized medium accommodated in the first master chamber 1220a. The elastic member 1250 is disposed between the first and second simulation pistons 1240 and 1230 to provide a pedal feeling through an elastic restoring force generated during compression. The simulator spring 1232 elastically supports the second simulation piston 1230 and the piston spring 1222 elastically supports the master piston 1220. The first simulation flow path 1260 connects the first simulation chamber 1240a and the reservoir 1100, and the first simulator valve 1261 is provided in the first simulation flow path 1260 to control the flow of the pressurized medium.

The first simulation chamber 1240a, the second simulation chamber 1230a, the first master chamber 1220a, and the second master chamber 1220b may be sequentially provided from the brake pedal 10 side (a right side based on FIG. 1) from an inside (a left side based on FIG. 1) on the cylinder block 1210 of the integrated master cylinder 1200.

The first simulation piston 1240 is provided in the first simulation chamber 1240a and may generate a hydraulic pressure or negative pressure in the pressurized medium accommodated therein by moving forward or backward.

The second simulation piston 1230 spans the second simulation chamber 1230a and the first master chamber 1220a and may generate a hydraulic pressure or negative pressure in the pressurized medium accommodated in each of the chambers by moving forward or backward. Specifically, the second simulation piston 1230 has one end (an end to the second simulation chamber 1230a side) having a larger diameter than another end (an end to the first master chamber 1220a), and thus the one end seals the second simulation chamber 1230a side and the other end seals the first master chamber 1220a to partition each of the chambers. Accordingly, as the second simulation piston 1230 moves forward or backward, the second simulation piston 1230 may generate a hydraulic pressure or negative pressure in the pressurized medium accommodated in the second simulation chamber 1230a and the first master chamber 1220a simultaneously.

The master piston 1220 is provided in the second master chamber 1220b and may generate a hydraulic pressure or negative pressure in the pressurized medium accommodated therein by moving forward or backward.

The first simulation chamber 1240a may be formed on the inlet side or the outermost side (the right side based on FIG. 1) of the cylinder block 1210, and the first simulation piston 1240 connected to the brake pedal 10 through an input rod 12 may be accommodated in the first simulation chamber 1240a to enable reciprocating movement.

The pressurized medium may be introduced into or discharged from the first simulation chamber 1240a through a first hydraulic port 1280a and a second hydraulic port 1280b. The first hydraulic port 1280a is connected to the first simulation flow path 1260 to be described later, so that the pressurized medium may be introduced or discharged from the first simulation chamber 1240a to the reservoir 1100. Also, the second hydraulic port 1280b is connected to the first backup flow path 1610 to be described later, so that the pressurized medium may be discharged to the first backup flow path 1610 from the first simulation chamber 1240a, or conversely, the pressurized medium may be introduced into the first simulation chamber 1240a from the first backup flow path 1610.

Meanwhile, the first simulation chamber 1240a may be assisted to be in communication with the reservoir 1100 through an auxiliary hydraulic port 1280h. By connecting an auxiliary reservoir flow path 1740 to the auxiliary hydraulic port 1280h, the flow of the pressurized medium between the first simulation chamber 1240a and the reservoir 1100 may be assisted. A sealing member 1290a to be described later is provided in front (the left side based on FIG. 1) of the auxiliary hydraulic port 1280h, so that supply of the pressurized medium from the auxiliary reservoir flow path 1740 to the first simulation chamber 1240a may be allowed, while a flow of the pressurized medium in opposite direction may be blocked. A sealing member 1290b to be described later is provided in a rear (the right side based on FIG. 1) of the auxiliary reservoir flow path 1740, so that the pressurized medium may be prevented from leaking to an outside of the cylinder block 1210 from the first simulation chamber 1240a.

The first simulation piston 1240 is accommodated in the first simulation chamber 1240a to pressurize the pressurized medium accommodated in the first simulation chamber 1240a or pressurize the elastic member 1250 by moving forward (a left direction based on FIG. 1) for generating a hydraulic pressure. Also, the first simulation piston 1240 may generate a negative pressure inside the first simulation chamber 1240*a* or return the elastic member 1250 to its original position and shape by moving backward (a right direction based on FIG. 1).

The second simulation chamber 1230*a* may be formed inside (the left side based on FIG. 1) of the first simulation chamber 1240*a* on the cylinder block 1210, and the second simulation piston 1230 may be accommodated in the second simulation chamber 1230*a* to enable reciprocating movement.

The pressurized medium may be introduced into or discharged from the second simulation chamber 1230*a* through a third hydraulic port 1280*c*. The third hydraulic port 1280*c* is connected to a first reservoir flow path 1710 to be described later, so that the pressurized medium accommodated in the second simulation chamber 1230*a* may be discharged to the reservoir 1100, or conversely, may be introduced from the reservoir 1100.

The second simulation piston 1230 is accommodated in the second simulation chamber 1230*a* to generate a hydraulic pressure of the pressurized medium accommodated in the second simulation chamber 1230*a* by moving forward, or to generate a negative pressure inside the second simulation chamber 1230*a* by moving backward. At the same time, the second simulation piston 1230 may generate a hydraulic pressure or negative pressure in the first master chamber 1220*a* to be described later by moving forward or backward. At least one sealing member 1290*c* may be provided between an inner wall of the cylinder block 1210 and an outer circumferential surface of one end (an end to the first simulation chamber 1240*a* side) of the second simulation piston 1230 in order to prevent leakage of the pressurized medium between adjacent chambers.

A step part formed in a stepped manner inwardly may be provided at a portion where the second simulation chamber 1230*a* is formed on the cylinder block 1210, and an extension part provided in an outer circumferential surface of the second simulation piston 1230 is extended outwardly to be caught by the step part. Specifically, on the cylinder block 1210, the step part formed in a stepped manner inwardly between the second simulation chamber 1230*a* and the first master chamber 1220*a* may be provided, and thus the first and second master chambers 1220*a* and 1220*b* may have a smaller diameter than the first and second simulation chambers 1240*a* and 1230*a*. Also, the extension part is provided at an end of the second simulation piston 1230 on a side of the first simulation chamber 1240*a* to be caught by the step part. The at least one sealing member 1290*c* is provided at the extension part to seal between the second simulation chamber 1230*a* and the first simulation chamber 1240*a*, and at the same time to pressurize the second simulation chamber 1230*a* when the second simulation piston 1230 moves forward. A sealing member 1290*d* at an end of the second simulation piston 1230 on a side of the first master chamber 1220*a* may seal between the second simulation chamber 1230*a* and the first master chamber 1220*a*, and at the same time, pressurize the first master chamber 1220*a* when the second simulation piston 1230 moves forward.

The first master chamber 1220*a* may be formed inside (the left side based on FIG. 1) the second simulation chamber 1230*a* on the cylinder block 1210, and the second simulation piston 1230 may be accommodated in the first master chamber 1220*a* to enable reciprocating movement.

The pressurized medium may be introduced into or discharged from the first master chamber 1220*a* through a fourth hydraulic port 1280*d* and a fifth hydraulic port 1280*e*. Specifically, the fourth hydraulic port 1280*d* is connected to a second reservoir flow path 1720 to be described later, and thus the pressurized medium may be discharged to the reservoir 1100, or conversely, introduced from the reservoir 1100. The fifth hydraulic port 1280*e* is connected to an auxiliary backup flow path 1630 to be described later, the pressurized medium may be discharged to the auxiliary backup flow path 1630 from the first master chamber 1220*a*, or conversely, may be introduced from the auxiliary backup flow path 1630 to the first master chamber 1220*a*. Meanwhile, a pair of sealing members 1290*d* may be provided in front of and at a rear of the fourth hydraulic port 1280*d* to prevent leakage of the pressurized medium.

The second simulation piston 1230 is accommodated in the first master chamber 1220*a*, and may generate a hydraulic pressure of the pressurized medium accommodated in the first master chamber 1220*a* by moving forward, or generate a negative pressure in the first master chamber 1220*a* by moving backward.

Also, the second simulation piston 1230 may include a cut-off hole 1231 to connect the first master chamber 1220*a* and the fourth hydraulic port 1280*d*. Specifically, the cut-off hole 1231 is formed through an inside of the second simulation piston 1230, and when the second simulation piston 1230 is in its original position, the cut-off hole 1231 connects the first master chamber 1220*a* and the fourth hydraulic port 1280*d*. When the second simulation piston 1230 deviates from its original position, the cut-off hole 1231 and the fourth hydraulic port 1280*d* are out of joint, and thus a connection between the first master chamber 1220*a* and the second reservoir flow path 1720 may be blocked. That is, the cut-off hole 1231 may be provided to selectively connect the first master chamber 1220*a* and the second reservoir flow path 1720. Accordingly, the second simulation piston 1230 connects the first master chamber 1220*a* and the reservoir 1100 in a normal operation mode to be described later, and in an abnormal operation mode, the second simulation piston 1230 moves, and thereby may block a connection between the first master chamber 1220*a* and the reservoir 1100.

The first master chamber 1220*a* may be formed inside (the left side based on FIG. 1) the second simulation chamber 1230*a* on the cylinder block 1210, and the second simulation piston 1230 may be accommodated in the first master chamber 1220*a* to enable reciprocating movement.

The pressurized medium may be introduced into or discharged from the second master chamber 1220*b* through a sixth hydraulic port 1280*f* and a seventh hydraulic port 1280*g*. Specifically, the sixth hydraulic port 1280*f* is connected to a third reservoir flow path 1730 to be described later, so that the pressurized medium may be discharged to the reservoir 1100, or conversely, introduced from the reservoir 1100. The seventh hydraulic port 1280*g* is connected to the second backup flow path 1620 to be described later, so that the pressurized medium may be discharged to the second backup flow path 1620 from the second master chamber 1220*b*, or conversely, be introduced from the second backup flow path 1620 to the second master chamber 1220*b*. Meanwhile, a pair of sealing members 1290*e* may be provided in front of and at a rear of the sixth hydraulic port 1280*f* to prevent leakage of the pressurized medium.

The master piston 1220 is accommodated in the second master chamber 1220*b*, and may generate a hydraulic pressure of the pressurized medium accommodated in the second master chamber 1220*b* by moving forward, or generate a negative pressure in the second master chamber 1220*b* by moving backward.

Also, the master piston 1220 may include a cut-off hole 1221 to connect the second master chamber 1220*b* and the sixth hydraulic port 1280*f* in the normal operation mode. Specifically, the cut-off hole 1221 is formed through an inside of the master piston 1220, and when the master piston 1220 is in its original position, the cut-off hole 1221 connects the second master chamber 1220*b* and the sixth hydraulic port 1280*f*. When the master piston 1220 deviates from its original position, the cut-off hole 1221 and the sixth hydraulic port 1280*f* are out of joint, and thus a connection between the second master chamber 1220*b* and the third reservoir flow path 1730 may be blocked. That is, the cut-off hole 1221 may be provided to selectively connect the second master chamber 1220*b* and the third reservoir flow path 1730. Accordingly, the master piston 1220 connects the second master chamber 1220*b* and the reservoir 1100 in the normal operation mode to be described later, and in the abnormal operation mode, the master piston 1220 moves, and thereby may block a connection between the second master chamber 1220*b* and the reservoir 1100.

Meanwhile, the integrated master cylinder 1200 according to the first embodiment of the disclosure may secure safety in the event of a failure of a component by utilizing the master chambers 1220*a* and 1220*b* and the simulation chambers 1230*a* and 1240*a*. For instance, the first simulation chamber 1240*a* and the first master chamber 1220*a* may be connected to any two wheel cylinders 20 among a right front wheel FR, a left front wheel FL, a left rear wheel RL and a right rear wheel RR through the first backup flow path 1610 and the auxiliary backup flow path 1630, which will be described later, and also the second master chamber 1220*b* may be connected to the other two wheel cylinders 20 through the second backup flow path 1620 to be described later. Accordingly, even when an error such as a leak occurs in any one of the chambers, braking may be performed, which will be described in detail with reference to FIG. 8.

The elastic member 1250 is disposed between the first simulation piston 1240 and the second simulation piston 1230 and provides the driver with a pedal feeling of the brake pedal 10 by its elastic restoring force. The elastic member 1250 may be made of a material such as compressible and expandable rubber, and the like. When displacement occurs in the first simulation piston 1240 by an operation of the brake pedal 10, but the second simulation piston 1230 maintains its original position, the elastic member 1250 is compressed, and the driver may receive a stable and familiar pedal feeling by an elastic restoring force of the compressed elastic member 1250, which will be described in detail later.

A receiving groove formed to be recessed in a manner that corresponds to a shape of the elastic member 1250 may be provided at a rear (the left side based on FIG. 1) of the first simulation piston 1240 facing the elastic member 1250, for smooth compression and deformation of the elastic member 1250.

The simulator spring 1232 is provided to elastically support the second simulation piston 1230. One end of the simulator spring 1232 is supported by the master piston 1220, and another end of the simulator spring 1232 is supported by the second simulation piston 1230 to elastically support the second simulation piston 1230. When displacement occurs in the second simulation piston 1230 by moving forward due to braking, the simulator spring 1232 is compressed, and then when the braking is released, the simulator spring 1232 is expanded by an elastic force and the second simulation piston 1230 returns to its original position.

The piston spring 1222 is provided to elastically support the master piston 1220. One end of the piston spring 1222 is supported by the cylinder block 1210 and another end of the piston spring 1222 is supported by the master piston 1220 to elastically support the master piston 1220. When displacement occurs in the master piston 1220 by moving forward due to braking, the piston spring 1222 is compressed, and then when the braking is released, the piston spring 1222 is expanded by an elastic force and the master piston 1220 returns to its original position.

The first simulation flow path 1260 is provided to communicate the first simulation chamber 1240*a* and the reservoir 1100 and may be provided with the first simulator valve 1261 to control the flow of the pressurized medium in both directions. The first simulator valve 1261 may be provided as a normally closed type solenoid valve that operates to be open when an electrical signal is received from the ECU in a normally closed state. The first simulator valve 1261 may be open in the normal operation mode of the electronic brake system 1000.

With respect to a pedal simulation operation by the integrated master cylinder 1200, in a normal operation, when the driver operates the brake pedal 10, at the same time, first cut valves 1611 and second cut valves 1621 provided in the first backup flow path 1610 and the second backup flow path 1620 to be described later are closed, and a reservoir valve 1711 provided in the first reservoir flow path 1710 is also closed. By contrast, the first simulator valve 1261 provided in the first simulation flow path 1260 is open. As the operation of the brake pedal 10 proceeds, the first simulation piston 1240 moves forward, but the first master chamber 1220*a* is closed by the closing operation of the first cut valves 1611, the second master chamber 1220*b* is closed by the closing operation of the second cut valves 1621, and the second simulation chamber 1230*a* is also closed by the closing operation of the reservoir valve 1711. Accordingly, a hydraulic pressure of the pressurized medium accommodated in the first simulation chamber 1240*a* is transferred to the reservoir 1100 through the first simulation flow path 1260, and thus the first simulation piston 1240 moves forward and a displacement occurs. By contrast, because the second simulation chamber 1230*a*, the first master chamber 1220*a* and the second master chamber 1220*b* are closed, a displacement does not occur in the second simulation piston 1230. Accordingly, the elastic member 1250 is compressed by the displacement of the first simulation piston 1240, and an elastic restoring force by the compression of the elastic member 1250 may be provided the driver with a pedal feeling. Afterwards, when the driver releases the pressing force of the brake pedal 10, the elastic member 1250 returns to its original position and shape by the elastic restoring force, and the first simulation chamber 1240*a* may be supplied with the pressurized medium from the reservoir 1100 through the first simulation flow path 1260, or be filled with the pressurized medium supplied from the first hydraulic circuit 1510 through the first backup flow path 1610 to be described later.

As described above, because an inside of each of the second simulation chamber 1230*a*, the first master chamber 1220*a* and the second master chamber 1220*b* is always filled with the pressurized medium, when the pedal simulation is operated, a friction of the second simulation chamber 1230*a* and the master piston 1220 is minimized, thereby improving a durability of the integrated master cylinder 1200 and preventing an inflow of foreign substances from an outside.

Meanwhile, when the electronic brake system 1000 is abnormally operated, i.e., when a fallback mode is performed, an operation of the integrated master cylinder 1200 will be described later with reference to FIG. 8.

The pressurized medium may be accommodated and stored in the reservoir 1100. The reservoir 1100 is connected to each constituent component such as the integrated master cylinder 1200, the hydraulic pressure supply device 1300 to be described later, the hydraulic circuits 1510 and 1520, and the like, in order to supply or be supplied with the pressurized medium. Although a plurality of reservoirs 1100 are illustrated with the same reference numeral in the drawings as an example for better understanding, the reservoir 1100 may be provided as a single component or a plurality of independent and separate components.

The reservoir flow path 1700 is provided to connect the integrated master cylinder 1200 and the reservoir 1100.

The reservoir flow path 1700 may include the first reservoir flow path 1710 that connects the second simulation chamber 1230a and the reservoir 1100, the second reservoir flow path 1720 that connects the first master chamber 1220a and the reservoir 1100, and the third reservoir flow path 1730 that connects the second master chamber 1220b and the reservoir 1100.

The reservoir valve 1711 may be provided in the first reservoir flow path 1710 as a two-way control valve that controls a flow of a braking fluid delivered through the first reservoir flow path 1710. The reservoir valve 1711 may be provided as a normally open type solenoid valve that operates to be closed when an electrical signal is received from the ECU in a normally open state. The reservoir valve 1711 may be closed in the normal operation mode of the electronic brake system 1000.

The hydraulic pressure supply device 1300 is provided to generate a hydraulic pressure of the pressurized medium through a mechanical operation by receiving an electrical signal corresponding to the driver's braking intention from the pedal displacement sensor 11 that detects a displacement of the brake pedal 10.

The hydraulic pressure supply device 1300 may include a motor (not shown) that generates a rotational force by the electrical signal received from the pedal displacement sensor 11, and a power transfer unit (not shown) that converts a rotational motion of the motor into a linear motion to provide the linear motion to a hydraulic pressure providing unit.

The hydraulic pressure supply device 1300 includes a cylinder block 1310 provided to accommodate the pressurized medium, a hydraulic piston 1320 accommodated in the cylinder block 1310, a sealing member 1350a provided between the hydraulic piston 1320 and the cylinder block 1310 to seal pressure chambers 1330 and 1340, and a drive shaft 1390 that transfers power output from the power transfer unit to the hydraulic piston 1320.

The pressure chambers 1330 and 1340 may include the first pressure chamber 1330 located on a front side (a left side of the hydraulic piston 1320 based on FIG. 1) of the hydraulic piston 1320, and the second pressure chamber 1340 located on a rear side (a right side of the hydraulic piston 1320 based on FIG. 1) of the hydraulic piston 1320. That is, the first pressure chamber 1330 is provided to be partitioned by the cylinder block 1310 and a front surface of the hydraulic piston 1320 so that a volume thereof varies depending on a movement of the hydraulic piston 1320, and the second pressure chamber 1340 is provided to be partitioned by the cylinder block 1310 and a rear surface of the hydraulic piston 1320 so that a volume thereof varies depending on the movement of the hydraulic piston 1320.

The first pressure chamber 1330 is connected to a first hydraulic flow path 1401 to be described later through a first communication hole 1360a formed on the cylinder block 1310. The second pressure chamber 1340 is connected to a second hydraulic flow path 1402 to be described later through a second communication hole 1360b formed on the cylinder block 1310.

A piston sealing member 1350a is provided between the hydraulic piston 1320 and the cylinder block 1310 to seal between the first pressure chamber 1330 and the second pressure chamber 1340. A hydraulic pressure or negative pressure in the first pressure chamber 1330 and the second pressure chamber 1340 generated by a forward or backward movement of the hydraulic piston 1320 may be transferred to the first hydraulic flow path 1401 and the second hydraulic flow path 1402 to be described later, by being sealed with the piston sealing member 1350a without leakage.

The motor (not shown) is provided to generate a driving force of the hydraulic piston 1320 by an electrical signal output from the ECU. The motor may include a stator and a rotor, and through the above, may provide power to generate a displacement of the hydraulic piston 1320 by rotating in a forward or reverse direction. A rotational angular speed and a rotational angle of the motor may be precisely controlled by a motor control sensor. Because the motor is a well-known technology, a detailed description related thereto is omitted.

The power transfer unit (not shown) is provided to convert a rotational force of the motor into a linear motion. For example, the power transfer unit may be provided to include a worm shaft (not shown), a worm wheel (not shown), and the drive shaft 1390.

The worm shaft may be integrally formed with a rotation shaft of the motor, and may rotate the worm wheel by having a worm formed on an outer circumferential surface thereof to be engaged with the worm wheel. The worm wheel may linearly move the drive shaft 1390 by being connected to be engaged with the drive shaft 1390, and the drive shaft 1390 is connected to the hydraulic piston 1320, through which the hydraulic piston 1320 may slidably move within the cylinder block 1310.

Explaining the above operations again, when the displacement of the brake pedal 10 is detected by the pedal displacement sensor 11, the detected signal is transmitted to the ECU, and the ECU drives the motor to rotate the worm shaft in one direction. The rotational force of the worm shaft is transferred to the drive shaft 1390 via the worm wheel, and the hydraulic piston 1320 connected to the drive shaft 1390 moves forward in the cylinder block 1310, thereby generating a hydraulic pressure in the first pressure chamber 1330.

By contrast, when the pressing force applied to the brake pedal 10 is released, the ECU drives the motor to rotate the worm shaft in an opposite direction. Accordingly, the worm wheel also rotates in the opposite direction, and the hydraulic piston 1320 connected to the drive shaft 1390 moves backward in the cylinder block 1310, thereby generating a negative pressure in the first pressure chamber 1330.

The generation of the hydraulic pressure and negative pressure in the second pressure chamber 1340 may be implemented by operating in an opposite way to the operations described above. That is, when the displacement of the brake pedal 10 is detected by the pedal displacement sensor 11, the detected signal is transmitted to the ECU, and the ECU drives the motor to rotate the worm shaft in an opposite direction. The rotational force of the worm shaft is transferred to the drive shaft 1390 via the worm wheel, and the hydraulic piston 1320 connected to the drive shaft 1390 moves backward in the cylinder block 1310, thereby generating a hydraulic pressure in the second pressure chamber 1340.

By contrast, when the pressing force applied to the brake pedal 10 is released, the ECU drives the motor in one direction to rotate the worm shaft in one direction. Accordingly, the worm wheel also rotates in the opposite direction, and the hydraulic piston 1320 connected to the drive shaft 1390 moves forward in the cylinder block 1310, thereby generating a negative pressure in the second pressure chamber 1340.

As described above, the hydraulic pressure supply device 1300 may generate a hydraulic pressure and a negative pressure in each of the first pressure chamber 1330 and the second pressure chamber 1340 depending on the rotation direction of the worm shaft by the operation of the motor. Also, whether braking is performed by transferring a hydraulic pressure or whether braking is released using a negative pressure may be determined by controlling the valves, which will be described in detail later.

Meanwhile, the power transfer unit according to the first embodiment is not limited to any one structure as long as it may convert the rotational motion of the motor into the linear motion of the hydraulic piston 1320, and may include devices with various structures and manners.

The hydraulic pressure supply device 1300 may be hydraulically connected to the reservoir 1100 by the dump control unit 1800. The dump control unit 1800 may include a first dump flow path 1810 to connect the first pressure chamber 1330 and the reservoir 1100, a first bypass flow path 1830 that rejoins after branching on the first dump flow path 1810, a second dump flow path 1820 to connect the second pressure chamber 1340 and the reservoir 1100, a second bypass flow path 1840 that rejoins after branching on the second dump flow path 1820, and an auxiliary dump flow path 1850 to subsidiarily connect the first pressure chamber 1330 and the reservoir 1100.

A first dump check valve 1811 and a first dump valve 1831 may be provided in the first dump flow path 1810 and the first bypass flow path 1830, respectively, to control the flow of the pressurized medium. The first dump check valve 1811 may be provided to allow only the flow of the pressurized medium from the reservoir 1100 to the first pressure chamber 1330 and block the flow of the pressurized medium in an opposite direction. The first bypass flow path 1830 may be connected in parallel to the first dump check valve 1811 on the first dump flow path 1810, and the first dump valve 1831 may be provided in the first bypass flow path 1830 to control the flow of the pressurized medium between the first pressure chamber 1330 and the reservoir 1100. That is, the first bypass flow path 1830 may be connected by bypassing a front end and a rear end of the first dump check valve 1811 on the first dump flow path 1810, and the first dump valve 1831 may be provided as a two-way solenoid valve that controls the flow of the pressurized medium between the first pressure chamber 1330 and the reservoir 1100. The first dump valve 1831 may be provided as a normally closed type solenoid valve that operates to be open when an electrical signal is received from the ECU in a normally closed state.

A second dump check valve 1821 and a second dump valve 1841 may be provided in the second dump flow path 1820 and the second bypass flow path 1840, respectively, to control the flow of the pressurized medium. The second dump check valve 1821 may be provided to allow only the flow of the pressurized medium from the reservoir 1100 to the second pressure chamber 1340 and block the flow of the pressurized medium in an opposite direction. The second bypass flow path 1840 may be connected in parallel to the second dump check valve 1821 on the second dump flow path 1820, and the second dump valve 1841 may be provided in the second bypass flow path 1840 to control the flow of the pressurized medium between the second pressure chamber 1340 and the reservoir 1100. That is, the second bypass flow path 1840 may be connected by bypassing a front end and a rear end of the second dump check valve 1821 on the second dump flow path 1820, and the second dump valve 1841 may be provided as a two-way solenoid valve that controls the flow of the pressurized medium between the second pressure chamber 1340 and the reservoir 1100. The second dump valve 1841 may be provided as a normally open type solenoid valve that operates to be closed when an electrical signal is received from the ECU in a normally open state.

The auxiliary dump flow path 1850 may assist a communication between the first pressure chamber 1330 and the reservoir 110 through an auxiliary hydraulic port 1850*a*. Specifically, the auxiliary hydraulic port 1850*a* is connected to the auxiliary dump flow path 1850, thereby may assist the flow of the pressurized medium between the first pressure chamber 1330 and the reservoir 110. A sealing member 1350*b* is provided in front (the left side based on FIG. 1) of the auxiliary hydraulic port 1850*a* to allow a supply of the pressurized medium from the auxiliary dump flow path 1850 to the first pressure chamber 1330 and block the flow of the pressurized medium in an opposite direction. Also, a sealing member 1350*c* is provided at rear (the right side based on FIG. 1) of the auxiliary dump flow path 1850 to prevent the pressurized medium from leaking from the first pressure chamber 1330 to an outside of the cylinder block 1310.

The hydraulic control unit 1400 may be provided to control a hydraulic pressure transferred to each of the wheel cylinders 20, and the ECU is provided to control the hydraulic pressure supply device 1300 and various valves based on hydraulic pressure information and pedal displacement information.

The hydraulic control unit 1400 may include the first hydraulic circuit 1510 that controls the flow of the pressurized medium transferred to first and second wheel cylinders 21 and 22 among the four wheel cylinders 20, and the second hydraulic circuit 1520 that controls the flow of the pressurized medium transferred to third and fourth wheel cylinders 23 and 24. Also, the hydraulic control unit 1400 includes a plurality of flow paths and valves to control the hydraulic pressure transferred to the wheel cylinders 20 from the hydraulic pressure supply device 1300.

The first hydraulic flow path 1401 may be provided to be in communication with the first pressure chamber 1330, and the second hydraulic flow path 1402 may be provided to be in communication with the second pressure chamber 1340. The first hydraulic flow path 1401 and the second hydraulic flow path 1402 may be joined into a third hydraulic flow path 1403, and then branched again to a fourth hydraulic flow path 1404 connected to the first hydraulic circuit 1510 and a fifth hydraulic flow path 1405 connected to the second hydraulic circuit 1520.

A sixth hydraulic flow path 1406 may be provided to be in communication with the first hydraulic circuit 1510, and a seventh hydraulic flow path 1407 may be provided to be in communication with the second hydraulic circuit 1520. The sixth hydraulic flow path 1406 and the seventh hydraulic flow path 1407 may be joined into an eighth hydraulic flow path 1408, and then branched again to a ninth hydraulic flow path 1409 communicating with the first pressure chamber 1330 and a tenth hydraulic flow path 1410 communicating with the second pressure chamber 1340.

A first valve 1431 to control the flow of the pressurized medium may be provided on the first hydraulic flow path 1401. The first valve 1431 may be provided as a check valve that allows only the flow of the pressurized medium discharged from the first pressure chamber 1330 and blocks the flow of the pressurized medium in an opposite direction. Also, a second valve 1432 to control the flow of the pressurized medium may be provided on the second hydraulic flow path 1402. The second valve 1432 may be provided as a check valve that allows only the flow of the pressurized medium discharged from the second pressure chamber 1340 and blocks the flow of the pressurized medium in an opposite direction.

The fourth hydraulic flow path 1404 is branched from the third hydraulic flow path 1403 where the first hydraulic flow path 1401 and the second hydraulic flow path 1402 join, and is connected to the first hydraulic circuit 1510. A third valve 1433 to control the flow of the pressurized medium may be provided on the fourth hydraulic flow path 1404. The third valve 1433 may be provided as a check valve that allows only the flow of the pressurized medium from the third hydraulic flow path 1403 to the first hydraulic circuit 1510 and blocks the flow of the pressurized medium in an opposite direction.

The fifth hydraulic flow path 1405 is branched from the third hydraulic flow path 1403 where the first hydraulic flow path 1401 and the second hydraulic flow path 1402 join, and is connected to the second hydraulic circuit 1520. A fourth valve 1434 to control the flow of the pressurized medium may be provided on the fifth hydraulic flow path 1405. The fourth valve 1434 may be provided as a check valve that allows only the flow of the pressurized medium from the third hydraulic flow path 1403 to the second hydraulic circuit 1520 and blocks the flow of the pressurized medium in an opposite direction.

The sixth hydraulic flow path 1406 in communication with the first hydraulic circuit 1510 and the seventh hydraulic flow path 1407 in communication with the second hydraulic circuit 1520 are provided to join into the eighth hydraulic flow path 1408. A fifth valve 1435 may be provided on the sixth hydraulic flow path 1406 to control the flow of the pressurized medium. The fifth valve 1435 may be provided as a check valve that allows only the flow of the pressurized medium discharged from the first hydraulic circuit 1510 and blocks the flow of the pressurized medium in an opposite direction. Also, a sixth valve 1436 may be provided on the seventh hydraulic flow path 1407 to control the flow of the pressurized medium. The sixth valve 1436 may be provided as a check valve that allows only the flow of the pressurized medium discharged from the second hydraulic circuit 1520 and blocks the flow of the pressurized medium in an opposite direction.

The ninth hydraulic flow path 1409 is branched from the eighth hydraulic flow path 1408 where the sixth hydraulic flow path 1406 and the seventh hydraulic flow path 1407 join, and is connected to the first pressure chamber 1330. A seventh valve 1437 may be provided on the ninth hydraulic flow path 1409 to control the flow of the pressurized medium. The seventh valve 1437 may be provided as a two-way control valve that controls the flow of the pressurized medium delivered along the ninth hydraulic flow path 1409. The seventh valve 1437 may be provided as a normally closed type solenoid valve that operates to be open when an electrical signal is received from the ECU in a normally closed state.

The tenth hydraulic flow path 1410 is branched from the eighth hydraulic flow path 1408 where the sixth hydraulic flow path 1406 and the seventh hydraulic flow path 1407 join, and is connected to the second pressure chamber 1340. An eighth valve 1438 may be provided on the tenth hydraulic flow path 1410 to control the flow of the pressurized medium. The eighth valve 1438 may be provided as a two-way control valve that controls the flow of the pressurized medium delivered along the tenth hydraulic flow path 1410. Like the seventh valve 1437, the eighth valve 1438 may be provided as a normally closed type solenoid valve that operates to be open when an electrical signal is received from the ECU in a normally closed state.

Due to the above-described arrangement of the hydraulic flow paths and valves of the hydraulic control unit 1400, the hydraulic pressure generated in the first pressure chamber 1330 according to the forward movement of the hydraulic piston 1320 may be transferred to the first hydraulic circuit 1510 by sequentially passing through the first hydraulic flow path 1401, the third hydraulic flow path 1403 and the fourth hydraulic flow path 1404, and transferred to the second hydraulic circuit 1520 by sequentially passing through the first hydraulic flow path 1401, the third hydraulic flow path 1403 and the fifth hydraulic flow path 1405. Also, the hydraulic pressure generated in the second pressure chamber 1340 according to the backward movement of the hydraulic piston 1320 may be transferred to the first hydraulic circuit 1510 by sequentially passing through the second hydraulic flow path 1402, the third hydraulic flow path 1403 and the fourth hydraulic flow path 1404, and transferred to the second hydraulic circuit 1520 by sequentially passing through the second hydraulic flow path 1402, the third hydraulic flow path 1403 and the fifth hydraulic flow path 1405.

By contrast, due to a negative pressure generated in the first pressure chamber 1330 by the backward movement of the hydraulic piston 1320, the pressurized medium provided to the first hydraulic circuit 1510 may be recovered to the first pressure chamber 1330 by sequentially passing through the sixth hydraulic flow path 1406, the eighth hydraulic flow path 1408 and the ninth hydraulic flow path 1409, and also the pressurized medium provided to the second hydraulic circuit 1520 may be recovered to the first pressure chamber 1330 by sequentially passing through the seventh hydraulic flow path 1407, the eighth hydraulic flow path 1408 and the ninth hydraulic flow path 1409. Also, due to a negative pressure generated in the second pressure chamber 1340 by the forward movement of the hydraulic piston 1320, the pressurized medium provided to the first hydraulic circuit 1510 may be recovered to the second pressure chamber 1340 by sequentially passing through the sixth hydraulic flow path 1406, the eighth hydraulic flow path 1408 and the tenth hydraulic flow path 1410, and also the pressurized medium provided to the second hydraulic circuit 1520 may be recovered to the second pressure chamber 1340 by sequentially passing through the seventh hydraulic flow path 1407, the eighth hydraulic flow path 1408 and the tenth hydraulic flow path 1410.

Also, due to the negative pressure generated in the first pressure chamber 1330 by the backward movement of the hydraulic piston 1320, the pressurized medium may be supplied from the reservoir 110 to the first pressure chamber 1330 through the first dump flow path 1810, and also due to the negative pressure generated in the second pressure chamber 1340 by the forward movement of the hydraulic piston 1320, the pressurized medium may be supplied from the reservoir 110 to the second pressure chamber 1340 through the second dump flow path 1820.

The delivery of the hydraulic pressure and negative pressure by the arrangement of the hydraulic flow paths and the valves will be described in greater detail with reference to FIGS. 2 to 7.

The first hydraulic circuit 1510 of the hydraulic control unit 1400 may control a hydraulic pressure in the first and second wheel cylinders 21 and 22, i.e., the two cylinders 20 among the four wheels RR, RL, FR and FL, and the second hydraulic circuit 1520 may control a hydraulic pressure in the third and fourth wheel cylinders 23 and 24, i.e., the other two wheel cylinders 20.

The first hydraulic circuit 1510 may receive the hydraulic pressure through the fourth hydraulic flow path 1404, and discharge the hydraulic pressure through the sixth hydraulic flow path 1406. To this end, as shown in FIG. 1, the fourth hydraulic flow path 1404 and the sixth hydraulic flow path 1406 may be joined, and then branched to two flow paths connected to the first wheel cylinder 21 and the second wheel cylinder 22. Also, the second hydraulic circuit 1520 may receive the hydraulic pressure through the fifth hydraulic flow path 1405, and discharge the hydraulic pressure through the seventh hydraulic flow path 1407. Accordingly, as shown in FIG. 1, the fifth hydraulic flow path 1405 and the seventh hydraulic flow path 1407 may be joined, and then branched to two flow paths connected to the third wheel cylinder 23 and the fourth wheel cylinder 24. However, a flow path connection shown in FIG. 1 is an example to help understanding, and the disclosure is not limited thereto. Each of the fourth hydraulic flow path 1404 and the sixth hydraulic flow path 1406 may be connected to the first hydraulic circuit 1510 side and independently branched and connected to the first wheel cylinder 21 and the second wheel cylinder 22, and likewise, each of the fifth hydraulic flow path 1405 and the seventh hydraulic flow path 1407 may be connected to the second hydraulic circuit 1520 side and independently branched and connected to the third wheel cylinder 23 and the fourth wheel cylinder 24. It should be understood to be the same even when the connection is made in various methods and structures.

The first and second hydraulic circuits 1510 and 1520 may include first to fourth inlet valves 1511a, 1511b, 1521a and 1521b, to control the flow and the hydraulic pressure of the pressurized medium transferred to the first to fourth wheel cylinders 20. The first to fourth inlet valves 1511a, 1511b, 1521a and 1521b are disposed on an upstream side of the first to fourth wheel cylinders 20, respectively, and may be provided as normally open type solenoid valves that operate to be closed when an electrical signal is received from the ECU in a normally open state.

The first and second hydraulic circuits 1510 and 1520 may include first to fourth check valves 1513a, 1513b, 1523a and 1523b provided to be connected in parallel to the first to fourth inlet valves 1511a, 1511b, 1521a and 1521b. The first to fourth check valves 1513a, 1513b, 1523a and 1523b may be provided in bypass flow paths that connect front and rear sides of the first to fourth inlet valves 1511a, 1511b, 1521a and 1521b on the first and second hydraulic circuits 1510 and 1520. Also, the first to fourth check valves 1513a, 1513b, 1523a and 1523b may allow only the flow of the pressurized medium from the respective wheel cylinders 20 to the hydraulic pressure supply device 1300 and block the flow of the pressurized medium from the hydraulic pressure supply device 1300 to the wheel cylinders 20. The hydraulic pressure of the pressurized medium applied to the respective wheel cylinders 20 may be quickly released by the first to fourth check valves 1513a, 1513b, 1523a and 1523b. Also, even when the first to fourth inlet valves 1511a, 1511b, 1521a and 1521b do not operate normally, the hydraulic pressure of the pressurized medium applied to the respective wheel cylinders 20 may be smoothly returned to the hydraulic pressure providing unit.

The first and second wheel cylinders 21 and 22 of the first hydraulic circuit 1510 may be branched from the first backup flow path 1610 to be descried later. The first backup flow path 1610 is provided with at least one first cut valve 1611 to control the flow of the pressurized medium between the integrated master cylinder 1200 and the first and second wheel cylinders 21 and 22. Also, in an anti-lock braking system (ABS) braking mode of a vehicle, the first cut valve 1611 selectively releases the hydraulic pressure of the pressurized medium applied to the first and second wheel cylinders 21 and 22, thereby may transfer the hydraulic pressure of the pressurized medium to the reservoir 1100 through the first backup flow path 1610, the first simulation chamber 1240a, and the first simulation flow path 1260.

The third and fourth wheel cylinders 23 and 24 of the second hydraulic circuit 1520 may be branched from the second backup flow path 1620 to be descried later. The second backup flow path 1620 is provided with at least one second cut valve 1621 to control the flow of the pressurized medium between the integrated master cylinder 1200 and the third and fourth wheel cylinders 23 and 24. Also, in the ABS braking mode of the vehicle, the second cut valve 1621 selectively releases the hydraulic pressure of the pressurized medium applied to the third and fourth wheel cylinders 23 and 24, thereby may transfer the hydraulic pressure of the pressurized medium to the reservoir 1100 through the second backup flow path 1620 and the second master chamber 1220b.

The electronic brake system 1000 according to the first embodiment may include the first and second backup flow paths and the auxiliary backup flow path 1610, 1620 and 1630 to implement braking by directly supplying the pressurized medium discharged from the integrated master cylinder 1200 to the wheel cylinders 20, when a normal operation may not be performed due to a device failure, or the like. An abnormal operation mode where the hydraulic pressure in the integrated master cylinder 1200 is directly transferred to the wheel cylinders 20 is referred to as a fallback mode.

The first backup flow path 1610 is provided to connect the first simulation chamber 1240a of the integrated master cylinder 1200 and the first hydraulic circuit 1510, and the second backup flow path 1620 is provided to connect the second master chamber 1220b of the integrated master cylinder 1200 and the second hydraulic circuit 1520. The auxiliary backup flow path 1630 is provided to connect the first master chamber 1220a of the integrated master cylinder 1200 and the first backup flow path 1610.

Specifically, one end of the first backup flow path 1610 may be connected to the first simulation chamber 1240a, and another end thereof may be connected to downstream sides of the first inlet valve 1511a and the second inlet valve 1511b on the first hydraulic circuit 1510. Also, one end of the second backup flow path 1620 may be connected to the second master chamber 1220b, and another end thereof may be connected to downstream sides of the third inlet valve 1521a and the fourth inlet valve 1521b on the second hydraulic circuit 1520. Also, the auxiliary backup flow path 1630 is joined to be connect to the first backup flow path 1610, but is not limited thereto. That is, the auxiliary backup flow path 1630 may be provided to connect the first simulation chamber 1240a and the first hydraulic circuit 1510 as a separate flow path.

The auxiliary backup flow path 1630 may include an orifice 1631 that may reduce a flow rate of the pressurized medium passing through the auxiliary backup flow path 1630. Accordingly, in a diagnosis mode to be described later, the pressurized medium transferred from the first hydraulic circuit 1510 to the integrated master cylinder 1200 may be filled in the first simulation chamber 1240a before the first master chamber 1220a, which will be described in detail later.

The first and second backup flow paths 1610 and 1620 may include at least one first and second cut valves 1611 and 1621, respectively, to control the bidirectional flow and hydraulic pressure of the pressurized medium transferred to the first to fourth wheel cylinders 20. Specifically, the first backup flow path 1610 may be branched to be connected to the first and second wheel cylinders 21 and 22, and a pair of first cut valves 1611 may be provided in each of the first and second wheel cylinders 21 and 22. Also, the second backup flow path 1620 may be branched to be connected to the third and fourth wheel cylinders 23 and 24, and a pair of second cut valves 1621 may be provided in each of the third and fourth wheel cylinders 23 and 24.

The first and second cut valves 1611 and 1621 may be provided as a normally open type solenoid valve that operates to be closed when an electrical signal is received from the ECU in a normally open state.

Accordingly, in a normal braking mode, when the first and second cut valves 1611 and 1621 are closed, the pressurized medium in the integrated master cylinder 1200 may be prevented from being directly transferred to the wheel cylinders 20 and at the same time, the hydraulic pressure provided from the hydraulic pressure supply device 1300 may be supplied to the wheel cylinders 20 through the hydraulic control unit 1400 to perform braking. By contrast, in an abnormal operation mode, the first and second cut valves 1611 and 1621 are open, and thus the pressurized medium pressurized in the integrated master cylinder 1200 may be directly supplied to the wheel cylinders 20 through the backup flow paths 1610, 1620 and 1630 to perform braking.

The electronic brake system 1000 according to the first embodiment of the disclosure may include a pressure sensor (PS) for detecting at least one hydraulic pressure in the first hydraulic circuit 1510 and the second hydraulic circuit 1520. Although it is illustrated that the pressure sensor is provided on the first hydraulic circuit 1510 side, a position and the number of pressure sensors are not limited thereto. As long as the pressure sensor may detect a hydraulic pressure of the hydraulic circuit and the integrated master cylinder 1200, the position and the number thereof may vary.

Hereinafter, an operation method of the electronic brake system 1000 according to the first embodiment of the disclosure is described.

Operations of the electronic brake system 1000 according to the first embodiment of the disclosure may include a normal operation mode, an abnormal operation mode (fallback mode), an ABS dump mode, and a diagnosis mode. In the normal operation mode, various devices and valves of the electronic brake system 1000 operate normally without failure or error, and in the abnormal operation mode, the electronic brake system 1000 operates abnormally due to failure or error of various devices and valves. In the ABS dump mode, a hydraulic pressure in the wheel cylinders 20 is rapidly and continuously decompressed for ABS operation, and in the diagnosis mode, whether a leak occurs in the integrated master cylinder 1200 or the simulator valve 1261 is checked.

First, the normal operation mode among the operation methods of the electronic brake system 1000 according to the first embodiment of the disclosure is described.

The normal operation mode of the electronic brake system 1000 according to the first embodiment of the disclosure may be divided into first to third braking modes, as the hydraulic pressure transferred from the hydraulic pressure supply device 1300 to the wheel cylinders 20. Specifically, in the first braking mode, the hydraulic pressure by the hydraulic pressure supply device 1300 may be primarily provided to the wheel cylinders 20, and in the second braking mode, the hydraulic pressure by the hydraulic pressure supply device 1300 may be secondarily provided to the wheel cylinders 20 to transfer a higher braking pressure than in the first braking mode. In the third braking mode, the hydraulic pressure by the hydraulic pressure supply device 1300 may be thirdly provided to the wheel cylinders 20 to transfer a higher braking pressure than in the second braking mode.

The first to third braking modes may be changed by changing the operations of the hydraulic pressure supply device 1300 and the hydraulic control unit 1400. The hydraulic pressure supply device 1300 may provide a sufficiently high hydraulic pressure of pressurized medium without a high specification motor by utilizing the first to third braking modes, and further, may prevent unnecessary loads applied to the motor. Accordingly, a stable braking force may be secured while reducing the cost and weight of the brake system, and durability and operational reliability of the devices may be improved.

FIG. 2 is a hydraulic circuit diagram illustrating that the electronic brake system 1000 according to the first embodiment of the disclosure performs a first braking mode.

Referring to FIG. 2, when the driver depresses the brake pedal 10 at a beginning of the braking, the motor (not shown) operates to rotate in one direction, the rotational force of the motor is transferred to the hydraulic pressure supply device 1300 by the power transfer unit, and the hydraulic piston 1320 of the hydraulic pressure supply device 1300 moves forward, thereby generating a hydraulic pressure in the first pressure chamber 1330. The hydraulic pressure discharged from the first pressure chamber 1330 is transferred to each of the wheel cylinders 20 through the hydraulic control unit 1400, the first hydraulic circuit 1510 and the second hydraulic circuit 1520, thereby generating a braking force.

Specifically, the hydraulic pressure generated in the first pressure chamber 1330 is primarily transferred to the first and second wheel cylinders 21 and 22 provided in the first hydraulic circuit 1510 by sequentially passing through the first hydraulic flow path 1401, the third hydraulic flow path 1403 and the fourth hydraulic flow path 1404. In this instance, because the first valve 1431 is a check valve allowing only the flow of the pressurized medium discharged from the first pressure chamber 1330 and the third valve 1433 is a check valve allowing only the flow of the pressurized medium from the third hydraulic flow path 1403 to the first hydraulic circuit 1510, the hydraulic pressure of the pressurized medium may be smoothly transferred to the first and second wheel cylinders 21 and 22. Also, the first inlet valve 1511a and the second inlet valve 1511b provided in the first hydraulic circuit 1510 are maintained in an open state and the first cut valves 1611 are maintained in a closed state, and thus the hydraulic pressure of the pressurized medium may be prevented from leaking to the reservoir 1100.

Also, the hydraulic pressure generated in the first pressure chamber 1330 is primarily transferred to the third and fourth wheel cylinders 23 and 24 provided in the second hydraulic circuit 1520 by sequentially passing through the first hydraulic flow path 1401, the third hydraulic flow path 1403 and the fifth hydraulic flow path 1405. As described above, because the first valve 1431 is a check valve allowing only the flow of the pressurized medium discharged from the first pressure chamber 1330 and the fourth valve 1434 is a check valve allowing only the flow of the pressurized medium from the third hydraulic flow path 1403 to the second hydraulic circuit 1520, the hydraulic pressure of the pressurized medium may be smoothly transferred to the third and fourth wheel cylinders 23 and 24. Also, the third inlet valve 1521*a* and the fourth inlet valve 1521*b* provided in the second hydraulic circuit 1520 are maintained in an open state and the second cut valves 1621 are maintained in a closed state, and thus the hydraulic pressure of the pressurized medium may be prevented from leaking to the second backup flow path 1620.

The eighth valve 1438 is controlled in the closed state in the first braking mode, and thus the hydraulic pressure generated in the first pressure chamber 1330 may be prevented from leaking to the second pressure chamber 1340. Also, the first dump valve 1831 provided in the first bypass flow path 1830 is maintained in the closed state, and thus the hydraulic pressure generated in the first pressure chamber 1330 may be prevented from leaking to the reservoir 1100.

Meanwhile, a negative pressures is generated in the second pressure chamber 1340 as the hydraulic piston 1320 moves forward, the hydraulic pressure of the pressurized medium is transferred to the second pressure chamber 1340 from the reservoir 1100 through the second dump flow path 1820 and the second bypass flow path 1840, and thus the second braking mode to be described later may be prepared. Because the second dump check valve 1821 provided in the second dump flow path 1820 allows the flow of the pressurized medium from the reservoir 1100 to the second pressure chamber 1340, the pressurized medium may be stably supplied to the second pressure chamber 1340. The second dump valve 1841 provided in the second bypass flow path 1840 is switched to an open state, and thus the pressurized medium may be rapidly supplied to the first pressure chamber 1330 from the reservoir 1100.

In the first braking mode where braking of the wheel cylinders 20 is performed by the hydraulic pressure supply device 1300, the first cut valves 1611 and the second cut valves 1621 provided in the first backup flow path 1610 and the second backup flow path 1620, respectively, are switched to the closed state, the reservoir valve 1711 provided in the first reservoir flow path 1710 is switched to the closed state, and thus the pressurized medium discharged from the integrated master cylinder 1200 may be prevented from being delivered to the wheel cylinders 20.

Specifically, when the pressing force is applied to the brake pedal 10, the first master chamber 1220*a* is sealed because the first cut valves 1611 are closed, the second master chamber 1220*b* is sealed because the second cut valves 1621 are closed, and the second simulation chamber 1230*a* is sealed because the reservoir valve 1711 is closed. Accordingly, as the pressing force is applied to the brake pedal 10, the first master chamber 1220*a*, the second master chamber 1220*b* and the second simulation chamber 1230*a* are sealed, and thus the second simulation piston 1230 and the master piston 1220 are not displaced. On the other hand, because the simulator valve 1261 is open so that the first simulation chamber 1240*a* and the reservoir 1100 are in communication with each other, the pressurized medium accommodated in the first simulation chamber 1240*a* is supplied to the reservoir 1100 through the simulation flow path 1260, and the first simulation piston 1240 smoothly moves forward by the pressing force of the brake pedal 10 to generate displacement. As such, as the first simulation piston 1240 moves forward in a state where the second simulation piston 1230 is fixed, the elastic member 1250 disposed between the first simulation piston 1240 and the second simulation piston 1230 is compressed, and a reaction force corresponding to the pressing force of the brake pedal 10 acts by elastic restoring force of the compressed elastic member 1250, thereby providing a stable and proper pedal feeling to the driver.

The electronic brake system 1000 according to the first embodiment of the disclosure may switch from the first braking mode to the second braking mode illustrated in FIG. 3, when a higher braking pressure than in the first braking mode is required to be provided.

FIG. 3 is a hydraulic circuit diagram illustrating that the electronic brake system 1000 according to the first embodiment of the disclosure performs a second braking mode. Referring to FIG. 3, when a displacement or an operating speed of the brake pedal 10 detected by the pedal displacement sensor 11 is higher than a preset reference, or when a hydraulic pressure detected by the pressure sensor is higher than a preset reference, the ECU may switch from the first braking mode to the second braking mode by determining that a higher braking pressure is required.

When switching from the first braking mode to the second braking mode, the motor operates to rotate in another direction, and the rotational force of the motor is transferred by the power transfer unit to the hydraulic pressure providing unit so that the hydraulic piston 1320 moves backward, thereby generating a hydraulic pressure in the second pressure chamber 1340. The hydraulic pressure discharged from the second pressure chamber 1340 is transferred to each of the wheel cylinders 20 through the hydraulic control unit 1400, the first hydraulic circuit 1510 and the second hydraulic circuit 1520 to generate a braking force.

Specifically, the hydraulic pressure generated in the second pressure chamber 1340 is secondarily transferred to the first and second wheel cylinders 21 and 22 provided in the first hydraulic circuit 1510 by sequentially passing through the second hydraulic flow path 1402, the third hydraulic flow path 1403 and the fourth hydraulic flow path 1404. In this instance, because the second valve 1432 provided in the second hydraulic flow path 1402 is a check valve allowing only the flow of the pressurized medium discharged from the second pressure chamber 1340 and the third valve 1433 provided in the fourth hydraulic flow path 1404 is a check valve allowing only the flow of the pressurized medium from the third hydraulic flow path 1403 to the first hydraulic circuit 1510, the hydraulic pressure of the pressurized medium may be smoothly transferred to the first and second wheel cylinders 21 and 22. Also, the first inlet valve 1511*a* and the second inlet valve 1511*b* provided in the first hydraulic circuit 1510 are maintained in the open state, the first cut valves 1611 are maintained in the closed state, and thus the hydraulic pressure of the pressurized medium may be prevented from leaking to the reservoir 1100.

Also, the hydraulic pressure generated in the second pressure chamber 1340 is secondarily transferred to the third and fourth wheel cylinders 23 and 24 provided in the second hydraulic circuit 1520 by sequentially passing through the second hydraulic flow path 1402, the third hydraulic flow path 1403 and the fifth hydraulic flow path 1405. As described above, because the second valve 1432 provided in the second hydraulic flow path 1402 is a check valve allowing only the flow of the pressurized medium discharged from the second pressure chamber 1340 and the fourth valve 1434 provided in the fifth hydraulic flow path 1405 is a check valve allowing only the flow of the pressurized medium from the third hydraulic flow path 1403 to the second hydraulic circuit 1520, the hydraulic pressure of the pressurized medium may be smoothly transferred to the third and fourth wheel cylinders 23 and 24. Also, the third inlet valve 1521a and the fourth inlet valve 1521b provided in the second hydraulic circuit 1520 are maintained in the open state and the second cut valves 1621 are maintained in the closed state, and thus the hydraulic pressure of the pressurized medium may be prevented from leaking to the second backup flow path 1620.

The seventh valve 1437 is controlled in a closed state in the second braking mode, and thus the hydraulic pressure generated in the second pressure chamber 1340 may be prevented from leaking to the first pressure chamber 1330. Also, the second dump valve 1841 is switched to a closed state, and thus the hydraulic pressure generated in the second pressure chamber 1340 may be prevented from leaking to the reservoir 1100.

Meanwhile, a negative pressures is generated in the first pressure chamber 1330 as the hydraulic piston 1320 moves backward, the hydraulic pressure of the pressurized medium is transferred to the first pressure chamber 1330 from the reservoir 1100 through the first dump flow path 1810 and the first bypass flow path 1830, and thus the third braking mode to be described later may be prepared. Because the first dump check valve 1811 provided in the first dump flow path 1810 allows the flow of the pressurized medium from the reservoir 1100 to the first pressure chamber 1330, the pressurized medium may be stably supplied to the first pressure chamber 1330. The first dump valve 1831 provided in the first bypass flow path 1830 is switched to an open state, and thus the pressurized medium may be rapidly supplied to the first pressure chamber 1330 from the reservoir 1100.

Because the operation of the integrated master cylinder 1200 in the second braking mode is the same as that of the integrated master cylinder 1200 in the first braking mode described above, a description thereof is omitted to prevent duplication of content.

The electronic brake system 1000 according to the first embodiment of the disclosure may switch from the second braking mode to the third braking mode illustrated in FIG. 4, when a higher braking pressure than in the second braking mode is required to be provided.

FIG. 4 is a hydraulic circuit diagram illustrating that the electronic brake system 1000 according to the first embodiment of the disclosure performs the third braking mode.

Referring to FIG. 4, when a displacement or an operating speed of the brake pedal 10 detected by the pedal displacement sensor 11 is higher than a preset reference, or when a hydraulic pressure detected by the pressure sensor is higher than a preset reference, the ECU may switch from the second braking mode to the third braking mode by determining that a higher braking pressure is required.

When switching from the second braking mode to the third braking mode, the motor (not shown) operates to rotate in one direction, and the rotational force of the motor is transferred by the power transfer unit to the hydraulic pressure providing unit so that the hydraulic piston 1320 of the hydraulic pressure providing unit moves forward again, thereby generating a hydraulic pressure in the first pressure chamber 1330. The hydraulic pressure discharged from the first pressure chamber 1330 is transferred to each of the wheel cylinders 20 through the hydraulic control unit 1400, the first hydraulic circuit 1510 and the second hydraulic circuit 1520 to generate a braking force.

Specifically, a portion of the hydraulic pressure generated in the first pressure chamber 1330 is primarily transferred to the first and second wheel cylinders 21 and 22 provided in the first hydraulic circuit 1510 by sequentially passing through the first hydraulic flow path 1401, the third hydraulic flow path 1403 and the fourth hydraulic flow path 1404. In this instance, because the first valve 1431 is a check valve allowing only the flow of the pressurized medium discharged from the first pressure chamber 1330 and the third valve 1433 is a check valve allowing only the flow of the pressurized medium from the third hydraulic flow path 1403 to the first hydraulic circuit 1510, the hydraulic pressure of the pressurized medium may be smoothly transferred to the first and second wheel cylinders 21 and 22. Also, the first inlet valve 1511a and the second inlet valve 1511b provided in the first hydraulic circuit 1510 are maintained in the open state and the first cut valves 1611 are maintained in the closed state, and thus the hydraulic pressure of the pressurized medium may be prevented from leaking to the reservoir 1100.

Also, a portion of the hydraulic pressure generated in the first pressure chamber 1330 is primarily transferred to the third and fourth wheel cylinders 23 and 24 provided in the second hydraulic circuit 1520 by sequentially passing through the first hydraulic flow path 1401, the third hydraulic flow path 1403 and the fifth hydraulic flow path 1405. As described above, because the first valve 1431 is a check valve allowing only the flow of the pressurized medium discharged from the first pressure chamber 1330 and the fourth valve 1434 is a check valve allowing only the flow of the pressurized medium from the third hydraulic flow path 1403 to the second hydraulic circuit 1520, the hydraulic pressure of the pressurized medium may be smoothly transferred to the third and fourth wheel cylinders 23 and 24. Also, the third inlet valve 1521a and the fourth inlet valve 1521b provided in the second hydraulic circuit 1520 are maintained in the open state and the second cut valves 1621 are maintained in the closed state, and thus the hydraulic pressure of the pressurized medium may be prevented from leaking to the second backup flow path 1620.

Meanwhile, because a high hydraulic pressure is provided in the third braking mode, as the hydraulic piston 1320 moves forward, the hydraulic pressure in the first pressure chamber 1330 also increases a force to move the hydraulic piston 1320 backward, and thus a load applied to the motor drastically increases. Accordingly, in the third braking mode, the seventh valve 1437 and the eighth valve 1438 operate to be open to allow the flow of the pressurized medium through the ninth hydraulic flow path 1409 and the tenth hydraulic flow path 1410. That is, a portion of the hydraulic pressure generated in the first pressure chamber 1330 may be supplied to the second pressure chamber 1340 by sequentially passing through the ninth hydraulic flow path 1409 and the tenth hydraulic flow path 1410, and through this, the first pressure chamber 1330 and the second pressure chamber 1340 are in communication with each other to synchronize the hydraulic pressure. Accordingly, the load applied to the motor may be reduced and durability and reliability of devices may be improved.

In the third braking mode, the first dump valve 1831 is switched to the closed state, and thus the hydraulic pressure generated in the first pressure chamber 1330 may be prevented from leaking to the reservoir 1100 along the first bypass flow path 1830. Also, the second dump valve 1841 is controlled in the closed state, and thus a negative pressure may be rapidly generated in the second pressure chamber 1340 by the forward movement of the hydraulic piston 1320 and the pressurized medium provided from the first pressure chamber 1330 may be smoothly supplied.

Because the operation of the integrated master cylinder 1200 in the third braking mode is the same as that of the integrated master cylinder 1200 in the first and second braking modes described above, a description thereof is omitted to prevent duplication of content.

Hereinafter, a method of operating the electronic brake system 1000 according to the first embodiment of the disclosure in which braking is released from the normal operation mode is described.

FIG. 5 is a hydraulic circuit diagram illustrating that the hydraulic piston 1320 of the electronic brake system 1000 according to the first embodiment of the disclosure moves backward to release the third braking mode.

Referring to FIG. 5, when the pressing force applied to the brake pedal 10 is released, the motor generates a rotational force in the other direction and transfers the rotational force to the power transfer unit, and the power transfer unit moves the hydraulic piston 1320 backward. Accordingly, the hydraulic pressure in the first pressure chamber 1330 may be released and at the same time, a negative pressure may be generated. Thus, the pressurized medium in the wheel cylinders 20 may be delivered to the first pressure chamber 1330.

Specifically, the hydraulic pressure in the first and second wheel cylinders 21 and 22 provided in the first hydraulic circuit 1510 is recovered to the first pressure chamber 1330 by sequentially passing through the sixth hydraulic flow path 1406, the eighth hydraulic flow path 1408 and the ninth hydraulic flow path 1409. In this instance, because the fifth valve 1435 provided in the sixth hydraulic flow path 1406 is a check valve allowing only the flow of the pressurized medium discharged from the first hydraulic circuit 1510, the pressurized medium may be recovered, and the seventh valve 1437 is open to allow the flow of the pressurized medium through the ninth hydraulic flow path 1409. Also, the first dump valve 1831 is operated to be closed so that a negative pressure is effectively generated in the first pressure chamber 1330.

At the same time, in order to enable the hydraulic piston 1320 to move backward rapidly and smoothly, the pressurized medium accommodated in the second pressure chamber 1340 is transferred to the first pressure chamber 1330 by sequentially passing through the tenth hydraulic flow path 1410 and the ninth hydraulic flow path 1409. To this end, the eighth valve 1438 provided in the tenth hydraulic flow path 1410 is also switched to the open state. In this instance, the second dump valve 1841 operates to be closed, thereby may induce the pressurized medium of the second pressure chamber 1340 to be supplied to the first pressure chamber 1330. The first inlet valve 1511*a* and the second inlet valve 1511*b* provided in the first hydraulic circuit 1510 are maintained in the open state and the first cut valves 1611 are maintained in the closed state.

Also, the hydraulic pressure of the pressurized medium applied to the third and fourth wheel cylinders 23 and 24 provided in the second hydraulic circuit 1520 by the negative pressure generated in the first pressure chamber 1330 is recovered to the first pressure chamber 1330 by sequentially passing through the seventh hydraulic flow path 1407, the eighth hydraulic flow path 1408 and the ninth hydraulic flow path 1409. As described above, because the sixth valve 1436 provided in the seventh hydraulic flow path 1407 is a check valve allowing only the flow of the pressurized medium discharged from the second hydraulic circuit 1520, the pressurized medium may be recovered, and the seventh valve 1437 is open to allow the flow of the pressurized medium through the ninth hydraulic flow path 1409. Also, the third inlet valve 1521*a* and the fourth inlet valve 1521*b* provided in the second hydraulic circuit 1520 are maintained in the open state and the second cut valves 1621 are maintained in the closed state.

After the releasing of the third braking mode is completed, it may be switched to the releasing operation of the second braking mode illustrated in FIG. 6 in order to further lower the braking pressure of the wheel cylinders.

FIG. 6 is a hydraulic circuit diagram illustrating that the hydraulic piston 1320 of the electronic brake system 1000 according to the first embodiment of the disclosure moves forward to release the second braking mode.

Referring to FIG. 6, when the pressing force applied to the brake pedal 10 is released, the motor generates a rotational force in one direction and transfers the rotational force to the power transfer unit, and the power transfer unit moves the hydraulic piston 1320 forward. Accordingly, the hydraulic pressure in the second pressure chamber 1340 may be released and at the same time, a negative pressure may be generated. Thus, the pressurized medium in the wheel cylinders 20 may be delivered to the second pressure chamber 1340.

Specifically, the hydraulic pressure in the first and second wheel cylinders 21 and 22 provided in the first hydraulic circuit 1510 is recovered to the second pressure chamber 1340 by sequentially passing through the sixth hydraulic flow path 1406, the eighth hydraulic flow path 1408 and the tenth hydraulic flow path 1410. In this instance, because the fifth valve 1435 provided in the sixth hydraulic flow path 1406 allows only the flow of the pressurized medium discharged from the first hydraulic circuit 1510, the pressurized medium may be recovered, and the eighth valve 1438 provided in the tenth hydraulic flow path 1410 is switched to be open to allow the flow of the pressurized medium delivered along the tenth hydraulic flow path 1410. Also, the seventh valve 1437 is controlled in the closed state so that the pressurized medium recovered from the first hydraulic circuit 1510 may be prevented from leaking to the first pressure chamber 1330 through the ninth hydraulic flow path 1409. The first inlet valve 1511*a* and the second inlet valve 1511*b* provided in the first hydraulic circuit 1510 are maintained in the open state and the first cut valves 1611 are maintained in the closed state.

Also, the hydraulic pressure of the pressurized medium applied to the third and fourth wheel cylinders 23 and 24 provided in the second hydraulic circuit 1520 by the negative pressure generated in the second pressure chamber 1340 is recovered to the second pressure chamber 1340 by sequentially passing through the seventh hydraulic flow path 1407, the eighth hydraulic flow path 1408 and the tenth hydraulic flow path 1410. As described above, because the sixth valve 1436 provided in the seventh hydraulic flow path 1407 allows the flow of the pressurized medium discharged from the second hydraulic circuit 1520 and the eighth valve 1438 provided in the tenth hydraulic flow path 1410 is open, the pressurized medium may be smoothly recovered to the second pressure chamber 1340. Further, the seventh valve 1437 is controlled in the closed state, the pressurized medium recovered from the first hydraulic circuit 1510 may be prevented from leaking to the first pressure chamber 1330 through the ninth hydraulic flow path 1409. The third inlet valve 1521a and the fourth inlet valve 1521b provided in the second hydraulic circuit 1520 are maintained in the open state and the second cut valves 1621 are maintained in the closed state.

Meanwhile, when the second braking mode is released, the first dump valve 1831 is open for smooth forward movement of the hydraulic piston 1320 and the second dump valve 1841 may be switched to the closed state to rapidly generate a negative pressure in the second pressure chamber 1340.

After the releasing of the second braking mode is completed, it may be switched to the releasing operation of the first braking mode illustrated in FIG. 7 in order to completely release the braking pressure applied to the wheel cylinders 20.

FIG. 7 is a hydraulic circuit diagram illustrating that the hydraulic piston 1320 of the electronic brake system 1000 according to the first embodiment of the disclosure moves backward again to release the first braking mode.

Referring to FIG. 7, when the pressing force applied to the brake pedal 10 is released, the motor generates a rotational force in the other direction and transfers the rotational force to the power transfer unit, and the power transfer unit moves the hydraulic piston 1320 backward. Accordingly, a negative pressure may be generated in the first pressure chamber 1330, and thus, the pressurized medium in the wheel cylinders 20 may be delivered to the first pressure chamber 1330.

Specifically, the hydraulic pressure in the first and second wheel cylinders 21 and 22 provided in the first hydraulic circuit 1510 is recovered to the first pressure chamber 1330 by sequentially passing through the sixth hydraulic flow path 1406, the eighth hydraulic flow path 1408 and the ninth hydraulic flow path 1409. In this instance, because the fifth valve 1435 provided in the sixth hydraulic flow path 1406 is a check valve allowing only the flow of the pressurized medium discharged from the first hydraulic circuit 1510, the pressurized medium may be recovered, and the seventh valve 1437 is open to allow the flow of the pressurized medium through the ninth hydraulic flow path 1409. The first inlet valve 1511a and the second inlet valve 1511b provided in the first hydraulic circuit 1510 are maintained in the open state and the first cut valves 1611 are maintained in the closed state. Also, the eighth valve 1438 is controlled in the closed state so that the pressurized medium recovered from the first hydraulic circuit 1510 may be prevented from leaking to the second pressure chamber 1340 through the tenth hydraulic flow path 1410, and the first dump valve 1831 is operated to be closed so that a negative pressure is effectively generated in the first pressure chamber 1330.

The hydraulic pressure of the pressurized medium applied to the third and fourth wheel cylinders 23 and 24 provided in the second hydraulic circuit 1520 by the negative pressure generated in the first pressure chamber 1330 is recovered to the first pressure chamber 1330 by sequentially passing through the seventh hydraulic flow path 1407, the eighth hydraulic flow path 1408 and the ninth hydraulic flow path 1409. As described above, because the sixth valve 1436 provided in the seventh hydraulic flow path 1407 is a check valve allowing only the flow of the pressurized medium discharged from the second hydraulic circuit 1520, the pressurized medium may be recovered, and the seventh valve 1437 is open to allow the flow of the pressurized medium through the ninth hydraulic flow path 1409. Also, the third inlet valve 1521a and the fourth inlet valve 1521b provided in the second hydraulic circuit 1520 are maintained in the open state. Further, the eighth valve 1438 is controlled in the closed state so that the pressurized medium recovered from the second hydraulic circuit 1520 may be prevented from leaking to the second pressure chamber 1340 through the tenth hydraulic flow path 1410. The third inlet valve 1521a and the fourth inlet valve 1521b provided in the second hydraulic circuit 1520 are maintained in the open state and the second cut valves 1621 are maintained in the closed state.

At the same time, the second dump valve 1841 is open for smooth backward movement of the hydraulic piston 1320, and thus the pressurized medium accommodated in the second pressure chamber 1340 may be discharged to the reservoir 1100 through the second bypass flow path 1840.

Hereinafter, an operation state when the electronic brake system 1000 according to the first embodiment of the disclosure does not operate normally, i.e., a fallback mode, is described.

FIG. 8 is a hydraulic circuit diagram illustrating an operation in an abnormal operation mode (fallback mode) where the electronic brake system 1000 according to the first embodiment of the disclosure may not operate normally due to a failure of device, and the like.

Referring to FIG. 8, in the abnormal operation mode, each of the valves is controlled to be in an initial braking state which is a non-operating state. In this instance, when the driver depresses the brake pedal 10, the first simulation piston 1240 connected to the brake pedal 10 moves forward, and thus displacement occurs. Because the first simulator valve 1261 is closed and the first cut valves 1611 are maintained in an open state, the pressurized medium accommodated in the first simulation chamber 1240a may be delivered to the first and second wheel cylinders 21 and 22 in the first hydraulic circuit 1510 through the first backup flow path 1610 by the forward movement of the first simulation piston 1240 to perform braking.

Also, when the first simulation piston 1240 moves forward, the second simulation chamber 1230a and the first master chamber 1220a are not sealed, and thus the elastic member 1250 is not compressed and the second simulation piston 1230 moves forward and displacement occurs. In this instance, because the reservoir valve 1711 is maintained in an open state, the pressurized medium accommodated in the second simulation chamber 1230a may be delivered to the reservoir 1100 through the first reservoir flow path 1710 by the displacement of the second simulation piston 1230. Because the first cut valves 1611 are maintained in the open state, the pressurized medium accommodated in the first master chamber 1220a may be delivered to the first and second wheel cylinders 21 and 22 in the first hydraulic circuit 1510 through the auxiliary backup flow path 1630 the first backup flow path 1610 to perform braking. As the second simulation piston 1230 moves forward, the cut-off hole 1231 provided in the second simulation piston 1230 blocks a connection between the first master chamber 1220a and the second reservoir flow path 1720 in order to prevent the pressurized medium accommodated in the first master chamber 1220a from being delivered to the reservoir 1100.

Also, when the second simulation piston 1230 moves forward, the pressurized medium in the first master chamber 1220a moves the master piston 1220 forward and displacement occurs. Because the second cut valves 1621 are maintained in an open state, the pressurized medium accommodated in the second master chamber 1220b may be delivered to the third and fourth wheel cylinders 23 and 24 in the second hydraulic circuit 1520 through the second backup flow path 1620 to perform braking. In this instance, as the master piston 1220 moves forward, the cut-off hole 1221 provided in the master piston 1220 blocks a connection between the second master chamber 1220b and the third reservoir flow path 1730 in order to prevent the pressurized medium from being delivered to the reservoir 1100.

In the abnormal operation mode, because the first cut valves 1611, the second cut valves 1621 and the reservoir valve 1711 are in the open state and the first simulator valve 1261 is in the closed state, the hydraulic pressure transferred from the first simulation chamber 1240a, the first master chamber 1220a and the second master chamber 1220b of the integrated master cylinder 1200 may be directly transferred to each of the wheel cylinders 20, thereby improving a braking stability and performing quick braking.

Hereinafter, an ABS dump mode of the electronic brake system 1000 according to the first embodiment of the disclosure is described.

FIG. 9 is a hydraulic circuit diagram illustrating that the electronic brake system 1000 according to the first embodiment of the disclosure operates in the ABS dump mode.

Referring to FIG. 9, when the ABS dump mode is to be performed while the hydraulic pressure supply device 1300 is operating, the ECU may be operated to control operations of the first and second cut valves 1611 and 1621 for braking.

Specifically, as the hydraulic piston 1320 of the hydraulic pressure supply device 1300 moves forward, a hydraulic pressure is generated in the first pressure chamber 1330, and the hydraulic pressure in the first pressure chamber 1330 is delivered to each of the wheel cylinders 20 through the hydraulic control unit 1400, the first hydraulic circuit 1510 and the second hydraulic circuit 1520, thereby generating a braking force. Afterwards, when the ABS dump mode is to be performed, the ECU repeatedly opens and closes at least a portion of the first cut valves 1611, so that a portion of the hydraulic pressure of the pressurized medium applied to the first and second wheel cylinders 21 and 22 may be discharged to the reservoir 1100 by sequentially passing through the first backup flow path 1610, the first simulation chamber 1240a and the first simulation flow path 1260. Also, the ECU repeatedly opens and closes at least a portion of the second cut valves 1621, so that a portion of the hydraulic pressure of the pressurized medium applied to the third and fourth wheel cylinders 23 and 24 may be discharged to the reservoir 1100 by sequentially passing through the second backup flow path 1620, the second master chamber 1220b and the third reservoir flow path 1730.

Hereinafter, a diagnosis mode of the electronic brake system 1000 according to the first embodiment of the disclosure is described.

The electronic brake system 1000 according to the first embodiment of the disclosure may perform the diagnosis mode for checking whether a leak occurs in the integrated master cylinder 1200. FIG. 10 is a hydraulic circuit diagram illustrating that the electronic brake system 1000 according to the first embodiment of the disclosure operates in the diagnosis mode. Referring to FIG. 10, when the diagnosis mode is performed, the ECU controls the hydraulic pressure generated in the hydraulic pressure supply device 1300 to be supplied to the first simulation chamber 1240a of the integrated master cylinder 1200.

Specifically, in a state where each of the valves is controlled to be in the initial braking state which is a non-operating state, the ECU operates to move the hydraulic piston 1320 forward to generate a hydraulic pressure in the first pressure chamber 1330, and at the same time, controls the second cut valves 1621 to be in the closed state. The hydraulic pressure generated in the first pressure chamber 1330 is transferred to the first hydraulic circuit 1510 by sequentially passing through the first hydraulic flow path 1401, the third hydraulic flow path 1403 and the fourth hydraulic flow path 1404. Also, the pressurized medium delivered to the first hydraulic circuit 1510 is delivered to the first simulation chamber 1240a through the first backup flow path 1610 by opening at least a portion of the first cut valves 1611.

In this instance, because the orifice 1631 provided in the auxiliary backup flow path 1630 slows down the delivery of the pressurized medium, the hydraulic pressure may be applied to the first simulation chamber 1240a first, and thus the second simulation piston 1230 may slightly move forward. Also, in order to move the second simulation piston 1230 forward even when the hydraulic pressure is applied to the first simulation chamber 1240a first, the reservoir valve 1711 is briefly open and then closed, the hydraulic pressure of the second simulation chamber 1230a is partially released, and thereby may move the second simulation piston 1230 forward. As described above, when the second simulation piston 1230 moves forward, the cut-off hole 1231 and the fourth hydraulic port 1280d are out of joint and blocked, and thus the first master chamber 1220a may be sealed.

Also, the first simulator valve 1261 remains closed, and thus the first simulation chamber 1240a may remain sealed.

Meanwhile, for quick diagnosis, the first inlet valve 1511a and the second inlet valve 1511b provided in the first hydraulic circuit 1510 may be switched to the closed state.

In this state, by comparing a hydraulic pressure value of the pressurized medium expected to be generated by the displacement of the hydraulic piston 1320 with a hydraulic pressure value of the first simulation chamber 1240a or the first hydraulic circuit 1510 measured by the pressure sensor (PS), a leak of the integrated master cylinder 1200 or the first simulator valve 1261 may be diagnosed. Specifically, an estimated hydraulic pressure value calculated based on a displacement amount of the hydraulic piston 1320 or a rotational angle measured by a motor control sensor (not shown) is compared with an actual hydraulic pressure value of the first simulation chamber 1240a or the first hydraulic circuit 1510 measured by the pressure sensor (PS), and when the two hydraulic pressure values are the same, it may be determined that no leak occurs in the integrated master cylinder 1200 or the first simulator valve 1261. By contrast, when the actual hydraulic pressure value of the first simulation chamber 1240a or the first hydraulic circuit 1510 measured by the pressure sensor is lower than the estimated hydraulic pressure value calculated based on the displacement amount of the hydraulic piston 1320 or the rotational angle measured by the motor control sensor (not shown), which indicates that a portion of the hydraulic pressure of the pressurized medium applied to the first simulation chamber 1240a is lost, and thus it may be determined that a leak occurs in the integrated master cylinder 1200 or the first simulator valve 1261, and this may be notified to the driver.

Hereinafter, an electronic brake system 2000 according to a second embodiment of the disclosure is described.

Also, in the description of the electronic brake system 2000 according to the second embodiment of the disclosure to be described below, except for additionally making a description using separate reference numerals, since the electronic brake system 2000 according to the second embodiment of the disclosure is the same as the electronic brake system 1000 according to the first embodiment of the disclosure, a description thereof is omitted to prevent duplication of content.

Recently, as the market demand for eco-friendly vehicles increases, hybrid vehicles with improved fuel efficiency are gaining popularity. A hybrid vehicle recovers kinetic energy as electrical energy while braking, stores it in a battery, and uses a motor as an auxiliary driving source of the vehicle. In general, a hybrid vehicle recovers energy by a generator (not shown), or the like, while braking to increase an energy recovery rate, which is called a regenerative braking mode. In the electronic brake system 2000 according to the second embodiment of the disclosure, a generator (not shown) may be provided in the third and fourth wheel cylinders 23 and 24 of the second hydraulic circuit 1520 to implement the regenerative braking mode. The regenerative braking mode may be implemented through cooperative control of the generator of the third and fourth wheel cylinders 23 and 24 and a fourth valve 2434, which is described with reference to FIG. 11.

FIG. 11 is a hydraulic circuit diagram illustrating the electronic brake system 2000 according to the second embodiment of the disclosure. Referring to FIG. 11, the fourth valve 2434 may be provided in the fifth hydraulic flow path 1405 according to the second embodiment of the disclosure to control the flow of the pressurized medium. The fourth valve 2434 may be provided as a two-way control valve that controls the flow of the pressurized medium delivered along the fifth hydraulic flow path 1405. The fourth valve 2434 may be provided as a normally closed type solenoid valve that operates to be open when an electrical signal is received from the ECU in a normally closed state. A fifth valve 2415 is controlled to be open in the normal operation mode, but when entering the regenerative braking mode by the generator (not shown) provided in the third and fourth wheel cylinders 23 and 24, the fifth valve 2415 may be switched to a closed state.

Hereinafter, the regenerative braking mode of the electronic brake system 2000 according to the second embodiment of the disclosure is described.

FIG. 12 is a hydraulic circuit diagram illustrating that the electronic brake system 2000 according to the second embodiment of the disclosure operates in a regenerative braking mode. Referring to FIG. 12, in the first and second wheel cylinders 21 and 22 of the first hydraulic circuit 1510, a braking force desired by a driver is formed by the hydraulic pressure of the pressurized medium by an operation of the hydraulic pressure supply device 1300 only. However, in the third and fourth wheel cylinders 23 and 24 of the second hydraulic circuit 1520 where an energy recovery device such as the generator, etc., is installed, a sum of braking pressures obtained by adding a braking pressure of the pressurized medium by the hydraulic pressure supply device 1300 and a regenerative braking pressure by the generator is required to be the same as a total braking force of the first and second wheel cylinders 21 and 22. Accordingly, when entering the regenerative braking mode, a total braking force of the third and fourth wheel cylinders 23 and 24 may be equal to the braking force of the first and second wheel cylinders 21 and 22, by removing or constantly maintaining a braking pressure applied to the third and fourth wheel cylinders 23 and 24 by the hydraulic pressure supply device 1300 through closing of the fourth valve 2434, and at the same time, by increasing the regenerative braking pressure by the generator.

Specifically, referring to FIG. 10, when the driver depresses the brake pedal 10 in the first braking mode, the motor operates to rotate in one direction, the rotational force of the motor is transferred to the hydraulic pressure supply device 1300 by the power transfer unit, and the hydraulic piston 1320 of the hydraulic pressure supply device 1300 moves forward, thereby generating a hydraulic pressure in the first pressure chamber 1330. The hydraulic pressure discharged from the first pressure chamber 1330 is transferred to each of the wheel cylinders 20 through the hydraulic control unit 1400, the first hydraulic circuit 1510 and the second hydraulic circuit 1520, thereby generating a braking force.

In the first hydraulic circuit 1510 where the energy recovery device such as the generator, etc., is not installed, the hydraulic pressure of the pressurized medium generated in the first pressure chamber 1330 is transferred to the first and second wheel cylinders 21 and 22 by sequentially passing through the first hydraulic flow path 1401, the third hydraulic flow path 1403 and the fourth hydraulic flow path 1404 to perform braking of the first and second wheel cylinders 21 and 22.

By contrast, in the second hydraulic circuit 1520 where the generator is installed, when the ECU determines to enter the regenerative braking mode by detecting a speed, a deceleration, etc., of the vehicle, the ECU may block the hydraulic pressure of the pressurized medium from being delivered to the third and fourth wheel cylinders 23 and 24 by closing the fourth valve 2434, thereby implementing a regenerative braking by the generator. Afterwards, when the ECU determines that the vehicle is in an unsuitable state for regenerative braking or a braking pressure of the first hydraulic circuit 1510 is different from that of the second hydraulic circuit 1520, the ECU may switch the fourth valve 2434 to an open state and control the hydraulic pressure of the pressurized medium to be delivered to the second hydraulic circuit 1520, and at the same time, may synchronize the braking pressure of the first hydraulic circuit 1510 with the braking pressure of the second hydraulic circuit 1520. Accordingly, the braking pressure or the braking force applied to the first to fourth wheel cylinders 21, 22, 23 and 24 may be evenly controlled, and thus oversteering or understeering may be prevented and a braking stability and a driving stability of the vehicle may be improved.

Hereinafter, an electronic brake system 3000 according to a third embodiment of the disclosure is described.

Also, in the description of the electronic brake system 3000 according to the third embodiment of the disclosure to be described below, except for additionally making a description using separate reference numerals, since the electronic brake system 3000 according to the third embodiment of the disclosure is the same as the electronic brake system 1000 according to the first embodiment of the disclosure, a description thereof is omitted to prevent duplication of content.

FIG. 13 is a hydraulic circuit diagram illustrating the electronic brake system 3000 according to the third embodiment of the disclosure. Referring to FIG. 13, an integrated master cylinder 3200 may further include a second simulation flow path 3270 that connects the first simulation chamber 1240a and the second simulation chamber 1230a. However, the second simulation flow path 3270 is not limited thereto, and may be provided to connect the first simulation flow path 1260 and the first reservoir flow path 1710, and more specifically, may have one end connected between the integrated master cylinder 3200 and the first simulator valve 1261 of the first simulation flow path 1260 and another end connected between the integrated master cylinder 3200 and a reservoir valve 3711 of the first reservoir flow path 1260.

A second simulator valve 3271 may be provided in the second simulation flow path 3270 as a two-way control valve to control a flow of a braking fluid delivered through the second simulation flow path 3270. The second simulator valve 3271 may be provided as a normally open type solenoid valve that operates to be closed when an electrical signal is received from the ECU in a normally open state. Also, the second simulator valve 3271 may be closed in the normal operation mode and the diagnosis mode of the electronic brake system 3000.

The reservoir valve 3711 may be provided in the first reservoir flow path 1710 as a two-way control valve to control the flow of the braking fluid delivered through the first reservoir flow path 1710. The reservoir valve 3711 may be provided as a normally closed type solenoid valve that operates to be open when an electrical signal is received from the ECU in a normally closed state. Accordingly, the reservoir valve 3711 may be closed in the normal operation mode, contrary to the reservoir valve 1711 of the electronic brake system 1000 according to the first embodiment of the disclosure.

Accordingly, when the electronic brake system 3000 according to the third embodiment of the disclosure operates in the abnormal operation mode (fallback mode), as the second simulation piston 1230 moves forward, the pressurized medium accommodated in the second simulation chamber 1230a is delivered to the first simulation chamber 1240a through the second simulation flow path 3270, but the reservoir valve 3711 is maintained in the closed state, thereby may block the pressurized medium accommodated in the second simulation chamber 1230a from being delivered to the reservoir 1100. Thus, the pressurized medium accommodated in the second simulation chamber 1230a may be provided to the first and second wheel cylinders 21 and 22 through the first backup flow path 1610, and a braking stability may be improved and quick braking may be performed, which will be described in detail with reference to FIG. 14.

As described above, a description of the same operation as the electronic brake system 1000 according to the first embodiment of the disclosure is omitted to prevent duplication of content. Only pedal simulation operation of the integrated master cylinder 1200 in the normal operation mode of the electronic brake system 3000 according to the third embodiment of the disclosure is described.

With respect to the pedal simulation operation by the integrated master cylinder 1200, in the normal operation mode (braking and release of braking), the driver operates the brake pedal 10, and at the same time, the first cut valves 1611 and the second cut valves 1621, and the reservoir valve 3711 and the second simulator valve 3271 operate to be closed, and thus the second simulation chamber 1230a, the first master chamber 1220a and the second master chamber 1220b may be sealed and the second simulation piston 1230 is not displaced. Accordingly, the elastic member 1250 is compressed by a displacement of the first simulation piston 1240, an elastic restoring force by the compression of the elastic member 1250 may be provided the driver with a pedal feeling, and the pressurized medium accommodated in the first simulation chamber 1240a may be delivered to the reservoir 1100 through the first simulation flow path 1260. Afterwards, when the driver releases the pressing force of the brake pedal 10, the elastic member 1250 returns to its original position and shape by the elastic restoring force, and the first simulation chamber 1240a may be filled with the pressurized medium supplied from the reservoir 1100 through the first simulation flow path 1260, or be filled with the pressurized medium supplied from the first hydraulic circuit 1510 through the first backup flow path 1610.

Hereinafter, an operation in a fallback mode, i.e., in which the electronic brake system 3000 according to the third embodiment of the disclosure does not operate normally, is described.

FIG. 14 is a hydraulic circuit diagram illustrating an operation in an abnormal operation mode (fallback mode) where the electronic brake system 3000 according to the third embodiment of the disclosure may not operate normally due to a failure of device, and the like.

Referring to FIG. 14, in the abnormal operation mode, each of the valves is controlled to be in an initial braking state which is a non-operating state. In this instance, when the driver depresses the brake pedal 10, the first simulation piston 1240 connected to the brake pedal 10 moves forward and thus displacement occurs. Because the first simulator valve 1261 is closed and the first cut valves 1611 are maintained in the open state, the pressurized medium accommodated in the first simulation chamber 1240a may be delivered to the first and second wheel cylinders 21 and 22 in the first hydraulic circuit 1510 through the first backup flow path 1610 by the forward movement of the first simulation piston 1240 to perform braking.

Also, when the first simulation piston 1240 moves forward, the second simulation chamber 1230a and the first master chamber 1220a are not sealed, and thus the elastic member 1250 is not compressed and the second simulation piston 1230 moves forward and displacement occurs. In this instance, because the reservoir valve 3711 is maintained in the closed state and the second simulator valve 3271 is maintained in an open state, the pressurized medium accommodated in the second simulation chamber 1230a may be delivered to the first simulation chamber 1240a through the second simulation flow path 3270 by the displacement of the second simulation piston 1230, and also, as described above, may be delivered to the first and second wheel cylinders 21 and 22 of the first hydraulic circuit 1510 through the first backup flow path 1610 to perform braking.

At the same time, when a displacement occurs by moving the second simulation piston 1230 forward, because the first cut valves 1611 are maintained in the open state, the pressurized medium accommodated in the first master chamber 1220a may be delivered to the first and second wheel cylinders 21 and 22 in the first hydraulic circuit 1510 by sequentially passing through the auxiliary backup flow path 1630 and the first backup flow path 1610 to perform braking. On the other hand, as the second simulation piston 1230 moves forward, the cut-off hole 1231 provided in the second simulation piston 1230 blocks a connection between the first master chamber 1220a and the second reservoir flow path 1720, and thereby may prevent the pressurized medium accommodated in the first master chamber 1220a from being delivered to the reservoir 1100.

Also, when the second simulation piston 1230 moves forward, the pressurized medium in the first master chamber 1220a moves the master piston 1220 forward and displacement occurs. Because the second cut valves 1621 are maintained in the open state, the pressurized medium accommodated in the second master chamber 1220b may be delivered to the third and fourth wheel cylinders 23 and 24 of the second hydraulic circuit 1520 through the second backup flow path 1620 to perform braking. In this instance, as the master piston 1220 moves forward, the cut-off hole 1221 provided in the master piston 1220 blocks a connection between the second master chamber 1220b and the third reservoir flow path 1730, and thereby may prevent the pressurized medium from being delivered to the reservoir 1100.

In the abnormal operation mode, because the first cut valves 1611, the second cut valves 1621 and the second simulator valve 3271 are in the open state and the reservoir valve 3711 and the first simulator valve 1261 are in the closed state, the hydraulic pressure transferred from the first simulation chamber 1240a, the second simulation chamber 1230a, the first master chamber 1220a and the second master chamber 1220b of the integrated master cylinder 1200, i.e., all the chambers of the integrated master cylinder 1200, may be directly transferred to each of the wheel cylinders 20, thereby improving a braking stability and performing quick braking.

Hereinafter, a diagnosis mode of the electronic brake system 3000 according to the third embodiment of the disclosure is described.

The electronic brake system 3000 according to the third embodiment of the disclosure may perform the diagnosis mode for checking a leak of the integrated master cylinder 1200. FIG. 15 is a hydraulic circuit diagram illustrating that the electronic brake system 3000 according to the third embodiment of the disclosure operates in the diagnosis mode. Referring to FIG. 15, when the diagnosis mode is performed, the ECU may control the hydraulic pressure generated from the hydraulic pressure supply device 1300 to be supplied to the first simulation chamber 1240a of the integrated master cylinder 1200.

As described above, a description of the same operation as the electronic brake system 1000 according to the first embodiment of the disclosure is omitted to prevent duplication of content. Only operation of a second simulation valve 3751 in the diagnosis mode of the electronic brake system 3000 according to the third embodiment of the disclosure is additionally described.

Specifically, in a state where each of the valves is controlled to be in the initial braking state which is a non-operating state, the ECU operates to move the hydraulic piston 1320 forward to generate a hydraulic pressure in the first pressure chamber 1330, and at the same time, controls the second cut valves 1621 to be in the closed state. The hydraulic pressure generated in the first pressure chamber 1330 is transferred to the first hydraulic circuit 1510 by sequentially passing through the first hydraulic flow path 1401, the third hydraulic flow path 1403 and the fourth hydraulic flow path 1404. Also, the pressurized medium delivered to the first hydraulic circuit 1510 is delivered to the first simulation chamber 1240a through the first backup flow path 1610 by opening at least a portion of the first cut valves 1611.

In this instance, the first simulator valve 1261 remains closed and the second simulator valve 3271 is additionally controlled to be in a closed state, and thereby may prevent the first simulation chamber 1240a and the second simulation chamber 1230a from communicating with each other and seal the first simulation chamber 1240a.

Meanwhile, for quick diagnosis, the first inlet valve 1511a and the second inlet valve 1511b provided in the first hydraulic circuit 1510 may be switched to the closed state.

In this state, by comparing a hydraulic pressure value of the pressurized medium expected to be generated by the displacement of the hydraulic piston 1320 with a hydraulic pressure value of the first simulation chamber 1240a or the first hydraulic circuit 1510 measured by the pressure sensor (PS), a leak of the integrated master cylinder 1200 or the first simulator valve 1261 may be diagnosed. Specifically, an estimated hydraulic pressure value calculated based on a displacement amount of the hydraulic piston 1320 or a rotational angle measured by the motor control sensor (not shown) is compared with an actual hydraulic pressure value of the first simulation chamber 1240a or the first hydraulic circuit 1510 measured by the pressure sensor (PS), and when the two hydraulic pressure values are the same, it may be determined that no leak occurs in the integrated master cylinder 1200 or the first simulator valve 1261. By contrast, when the actual hydraulic pressure value of the first simulation chamber 1240a or the first hydraulic circuit 1510 measured by the pressure sensor is lower than the estimated hydraulic pressure value calculated based on the displacement amount of the hydraulic piston 1320 or the rotational angle measured by the motor control sensor (not shown), which indicates that a portion of the hydraulic pressure of the pressurized medium applied to the first simulation chamber 1240a is lost, and thus it may be determined that a leak occurs in the integrated master cylinder 1200 or the first simulator valve 1261 and this may be notified to the driver.

The invention claimed is:

1. An electronic brake system, comprising:
a reservoir in which a pressurized medium is stored;
an integrated master cylinder comprising a first simulation chamber, a second simulation chamber, a first master chamber and a second master chamber having a smaller diameter than the second simulation chamber, a first simulation piston provided to pressurize the first simulation chamber and be displaceable by a brake pedal, a second simulation piston provided to pressurize the second simulation chamber and the first master chamber and be displaceable by a displacement of the first simulation piston or a hydraulic pressure of the first simulation chamber, a master piston provided to pressurize the second master chamber and be displaceable by a displacement of the second simulation piston or a hydraulic pressure of the first master chamber, an elastic member provided between the first simulation piston and the second simulation piston, a first simulation flow path to connect the first simulation chamber and the reservoir, and a first simulator valve provided in the first simulation flow path to control a flow of the pressurized medium;
a reservoir flow path to connect the integrated master cylinder and the reservoir;
a hydraulic pressure supply device configured to generate a hydraulic pressure by operating a hydraulic piston according to an electrical signal output in response to a displacement of the brake pedal, and comprising a first pressure chamber provided on one side of the hydraulic piston accommodated to be movable in a cylinder block and connected to one or more wheel cylinders, and a second pressure chamber provided on another side of the hydraulic piston and connected to the one or more wheel cylinders;
a hydraulic control unit having a first hydraulic circuit configured to control a hydraulic pressure transferred to two wheel cylinders and a second hydraulic circuit configured to control a hydraulic pressure transferred to other two wheel cylinders; and
an electronic control unit configured to control valves based on hydraulic pressure information and displacement information of the brake pedal,
wherein the hydraulic control unit comprises a first hydraulic flow path in communication with the first pressure chamber, a second hydraulic flow path in communication with the second pressure chamber, a third hydraulic flow path in which the first hydraulic flow path and the second hydraulic flow path join, a fourth hydraulic flow path branched from the third hydraulic flow path and connected to the first hydraulic circuit, a fifth hydraulic flow path branched from the third hydraulic flow path and connected to the second hydraulic circuit, a sixth hydraulic flow path in communication with the first hydraulic circuit, a seventh hydraulic flow path in communication with the second hydraulic circuit, an eighth hydraulic flow path in which the sixth hydraulic flow path and the seventh hydraulic flow path join, a ninth hydraulic flow path branched from the eight hydraulic flow path and connected to the first pressure chamber, and a tenth hydraulic flow path branched from the eight hydraulic flow path and connected to the second pressure chamber.

2. The electronic brake system of claim 1, wherein the hydraulic control unit comprises:
a first valve provided in the first hydraulic flow path to control the flow of the pressurized medium, a second valve provided in the second hydraulic flow path to control the flow of the pressurized medium, a third valve provided in the fourth hydraulic flow path to control the flow of the pressurized medium, a fourth valve provided in the fifth hydraulic flow path to control the flow of the pressurized medium, a fifth valve provided in the sixth hydraulic flow path to control the flow of the pressurized medium, a sixth valve provided in the seventh hydraulic flow path to control the flow of the pressurized medium, a seventh valve provided in the ninth hydraulic flow path to control the flow of the pressurized medium, and an eighth valve provided in the tenth hydraulic flow path to control the flow of the pressurized medium.

3. The electronic brake system of claim 2, wherein
the first valve is provided as a check valve that allows only the flow of the pressurized medium discharged from the first pressure chamber,
the second valve is provided as a check valve that allows only the flow of the pressurized medium discharged from the second pressure chamber,
the third valve is provided as a check valve that allows only the flow of the pressurized medium from the third hydraulic flow path to the first hydraulic circuit,
the fourth valve is provided as a check valve that allows only the flow of the pressurized medium from the third hydraulic flow path to the second hydraulic circuit,
the fifth valve is provided as a check valve that allows only the flow of the pressurized medium discharged from the first hydraulic circuit,
the sixth valve is provided as a check valve that allows only the flow of the pressurized medium discharged from the second hydraulic circuit, and
the seventh valve and the eighth valve are provided as solenoid valves that control the flow of the pressurized medium in both directions.

4. The electronic brake system of claim 3, further comprising:
a dump control unit provided between the reservoir and the hydraulic pressure supply device to control the flow of the pressurized medium,
wherein the dump control unit comprises a first dump flow path to connect the first pressure chamber and the reservoir, a first dump check valve provided in the first dump flow path and allowing only the flow of the pressurized medium from the reservoir to the first pressure chamber, a first bypass flow path connected in parallel to the first dump check valve on the first dump flow path, a first dump valve provided in the first bypass flow path to control the flow of the pressurized medium in both directions, a second dump flow path to connect the second pressure chamber and the reservoir, a second dump check valve provided in the second dump flow path and allowing only the flow of the pressurized medium from the reservoir to the second pressure chamber, a second bypass flow path connected in parallel to the second dump check valve on the second dump flow path, and a second dump valve provided in the second bypass flow path to control the flow of the pressurized medium in both directions.

5. The electronic brake system of claim 1, further comprising:
a first backup flow path to connect the first simulation chamber and the first hydraulic circuit;
a second backup flow path to connect the second master chamber and the second hydraulic circuit;
an auxiliary backup flow path to connect the first master chamber and the first backup flow path;
at least one first cut valve provided in the first backup flow path to control the flow of the pressurized medium; and
at least one second cut valve provided in the second backup flow path to control the flow of the pressurized medium.

6. The electronic brake system of claim 5, wherein the reservoir flow path comprises a first reservoir flow path comprising a reservoir valve to communicate the reservoir and the second simulation chamber and control the flow of the pressurized medium, a second reservoir flow path to communicate the reservoir and the first master chamber, and a third reservoir flow path to communicate the reservoir and the second master chamber.

7. The electronic brake system of claim 6, wherein the first hydraulic circuit comprises a first inlet valve and a second inlet valve to control the flow of the pressurized medium supplied to a first wheel cylinder and a second wheel cylinder, respectively, and
the second hydraulic circuit comprises a third inlet valve and a fourth inlet valve to control the flow of the pressurized medium supplied to a third wheel cylinder and a fourth wheel cylinder, respectively.

8. The electronic brake system of claim 2, wherein
the first valve is provided as a check valve that allows only the flow of the pressurized medium discharged from the first pressure chamber,
the second valve is provided as a check valve that allows only the flow of the pressurized medium discharged from the second pressure chamber,
the third valve is provided as a check valve that allows only the flow of the pressurized medium from the third hydraulic flow path to the first hydraulic circuit,
the fifth valve is provided as a check valve that allows only the flow of the pressurized medium discharged from the first hydraulic circuit,
the sixth valve is provided as a check valve that allows only the flow of the pressurized medium discharged from the second hydraulic circuit, and
the fourth valve, the seventh valve and the eighth valve are provided as solenoid valves that control the flow of the pressurized medium in both directions.

9. The electronic brake system of claim 8, wherein the first hydraulic circuit comprises a first wheel cylinder and a second wheel cylinder, and the second hydraulic circuit comprises a third wheel cylinder and a fourth wheel cylinder, and the electronic brake system further comprises:
a generator provided in the third wheel cylinder and the fourth wheel cylinder, respectively.

10. The electronic brake system of claim 5, wherein the integrated master cylinder further comprises a second simulation flow path to connect the first simulation chamber and the second simulation chamber, and
the second simulation flow path comprises a second simulator valve to control the flow of the pressurized medium.

11. An operation method of the electronic brake system of claim 4, the operation mode comprising:
as the hydraulic pressure transferred from the hydraulic pressure supply device to the wheel cylinders gradually increases, a first braking mode in which the hydraulic pressure is primarily provided, a second braking mode in which the hydraulic pressure is secondly provided by a forward movement of the hydraulic piston, and a third braking mode in which the hydraulic pressure is thirdly provided by a forward movement of the hydraulic piston after the second braking mode.

12. The operation method of claim 11, wherein, in the first braking mode, the eighth valve and the first dump valve are closed, and
a hydraulic pressure generated in the first pressure chamber by the forward movement of the hydraulic piston is provided to the first hydraulic circuit by sequentially passing through the first hydraulic flow path, the third hydraulic flow path, and the fourth hydraulic flow path, and is provided to the second hydraulic circuit by sequentially passing through the first hydraulic flow path, the third hydraulic flow path, and the fifth hydraulic flow path.

13. The operation method of claim 12, wherein, in the second braking mode, the seventh valve and the second dump valve are closed, and
a hydraulic pressure generated in the second pressure chamber by a backward movement of the hydraulic piston after the first braking mode is provided to the first hydraulic circuit by sequentially passing through the second hydraulic flow path, the third hydraulic flow path and the fourth hydraulic flow path, and is provided to the second hydraulic circuit by sequentially passing through the second hydraulic flow path, the third hydraulic flow path and the fifth hydraulic flow path.

14. The operation method of claim 13, wherein, in the third braking mode, the seventh valve and the eighth valve are open, the first dump valve and the second dump valve are closed,
a portion of the hydraulic pressure generated in the first pressure chamber by the forward movement of the hydraulic piston is provided to the first hydraulic circuit by sequentially passing through the first hydraulic flow path, the third hydraulic flow path and the fourth hydraulic flow path, and is provided to the second hydraulic circuit by sequentially passing through the first hydraulic flow path, the third hydraulic flow path and the fifth hydraulic flow path, and
a remaining portion of the hydraulic pressure generated in the first pressure chamber is provided to the second pressure chamber by sequentially passing through the ninth hydraulic flow path and the tenth hydraulic flow path.

15. The operation method of claim 12, wherein, when the first braking mode is released, the seventh valve and the second dump valve are open, the eighth valve and the first dump valve are closed,
a negative pressure is generated in the first pressure chamber by a backward movement of the hydraulic piston, the pressurized medium provided to the first hydraulic circuit is recovered to the first pressure chamber by sequentially passing through the sixth hydraulic flow path, the eighth hydraulic flow path and the ninth hydraulic flow path, and the pressurized medium provided to the second hydraulic circuit is recovered to the first pressure chamber by sequentially passing through the seventh hydraulic flow path, the eighth hydraulic flow path and the ninth hydraulic flow path.

16. The operation method of claim 13, wherein, when the second braking mode is released, the eighth valve and the first dump valve are open, the seventh valve and the second dump valve are closed,
a negative pressure is generated in the second pressure chamber by the forward movement of the hydraulic piston, the pressurized medium provided to the first hydraulic circuit is recovered to the second pressure chamber by sequentially passing through the sixth hydraulic flow path, the eighth hydraulic flow path and the tenth hydraulic flow path, and the pressurized medium provided to the second hydraulic circuit is recovered to the second pressure chamber by sequentially passing through the seventh hydraulic flow path, the eighth hydraulic flow path and the tenth hydraulic flow path.

17. The operation method of claim 14, wherein, when the third braking mode is released, the seventh valve and the eighth valve are open, the first dump valve is closed,
a negative pressure is generated in the first pressure chamber by the backward movement of the hydraulic piston, the pressurized medium provided to the first hydraulic circuit is recovered to the first pressure chamber by sequentially passing through the sixth hydraulic flow path, the eighth hydraulic flow path and the ninth hydraulic flow path, the pressurized medium provided to the second hydraulic circuit is recovered to the first pressure chamber by sequentially passing through the seventh hydraulic flow path, the eighth hydraulic flow path and the ninth hydraulic flow path, and
at least a portion of the pressurized medium in the second pressure chamber is supplied to the first pressure chamber by sequentially passing through the tenth hydraulic flow path and the ninth hydraulic flow path.

18. An electronic brake system, comprising:
a reservoir in which a pressurized medium is stored;
an integrated master cylinder having a master chamber and a simulation chamber to provide a driver with a reaction force corresponding to a pressing force of a brake pedal, and at the same time to pressurize and discharge a pressurized medium accommodated therein;
a reservoir flow path to connect the integrated master cylinder and the reservoir;
a hydraulic pressure supply device configured to generate a hydraulic pressure by operating a hydraulic piston according to an electrical signal output in response to a displacement of the brake pedal, and comprising a first pressure chamber provided on one side of the hydraulic piston accommodated to be movable in a cylinder block and connected to one or more wheel cylinders, and a second pressure chamber provided on another side of the hydraulic piston and connected to the one or more wheel cylinders;

a hydraulic control unit having a first hydraulic circuit configured to control a hydraulic pressure transferred to two wheel cylinders and a second hydraulic circuit configured to control a hydraulic pressure transferred to other two wheel cylinders; and an electronic control unit configured to control valves based on hydraulic pressure information and displacement information of the brake pedal, wherein the hydraulic control unit comprises a first hydraulic flow path in communication with the first pressure chamber, a second hydraulic flow path in communication with the second pressure chamber, a third hydraulic flow path in which the first hydraulic flow path and the second hydraulic flow path join, a fourth hydraulic flow path branched from the third hydraulic flow path and connected to the first hydraulic circuit, a fifth hydraulic flow path branched from the third hydraulic flow path and connected to the second hydraulic circuit, a sixth hydraulic flow path in communication with the first hydraulic circuit, a seventh hydraulic flow path in communication with the second hydraulic circuit, an eighth hydraulic flow path in which the sixth hydraulic flow path and the seventh hydraulic flow path join, a ninth hydraulic flow path branched from the eight hydraulic flow path and connected to the first pressure chamber, and a tenth hydraulic flow path branched from the eight hydraulic flow path and connected to the second pressure chamber.

19. The electronic brake system of claim 18, wherein the simulation chamber comprises a first simulation chamber and a second simulation chamber, the master chamber comprises a first master chamber and a second master chamber having a smaller diameter than the second simulation chamber, and the integrated master cylinder comprises a first simulation piston provided to pressurize the first simulation chamber and be displaceable by the brake pedal, a second simulation piston provided to pressurize the second simulation chamber and the first master chamber and be displaceable by a displacement of the first simulation piston and a hydraulic pressure of the first simulation chamber, a master piston provided to pressurize the second master chamber and be displaceable by a displacement of the second simulation piston and a hydraulic pressure of the first master chamber, an elastic member provided between the first simulation piston and the second simulation piston, a simulation flow path to connect the first simulation chamber and the reservoir, and a simulator valve provided in the simulation flow path to control the flow of the pressurized medium.

* * * * *